(12) United States Patent
Krishnamoorthi et al.

(10) Patent No.: US 8,625,474 B2
(45) Date of Patent: Jan. 7, 2014

(54) SYSTEM AND METHOD FOR THE SIMULTANEOUS RECEPTION OF FLO AND FLO-EV DATA

(75) Inventors: Raghuraman Krishnamoorthi, San Diego, CA (US); Krishna K. Mukkavilli, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 329 days.

(21) Appl. No.: 12/876,950

(22) Filed: Sep. 7, 2010

(65) Prior Publication Data

US 2011/0216678 A1 Sep. 8, 2011

Related U.S. Application Data

(60) Provisional application No. 61/240,957, filed on Sep. 9, 2009.

(51) Int. Cl.
*H04B 7/00* (2006.01)

(52) U.S. Cl.
USPC ........ 370/310.2; 370/322; 370/324; 370/326; 370/395.72; 370/412

(58) Field of Classification Search
None
See application file for complete search history.

(56) References Cited

U.S. PATENT DOCUMENTS

| | | | |
|---|---|---|---|
| 2001/0019613 A1* | 9/2001 | Dillon et al. | 380/240 |
| 2002/0067744 A1* | 6/2002 | Fujii et al. | 370/535 |
| 2002/0126685 A1* | 9/2002 | Leatherbury et al. | 370/432 |
| 2003/0026342 A1* | 2/2003 | Horiike et al. | 375/240.25 |
| 2003/0095536 A1* | 5/2003 | Hu et al. | 370/349 |
| 2005/0141475 A1* | 6/2005 | Vijayan et al. | 370/345 |
| 2005/0157822 A1* | 7/2005 | Khandekar et al. | 375/340 |
| 2005/0163226 A1* | 7/2005 | Chung | 375/240.25 |
| 2006/0148506 A1* | 7/2006 | Hoo | 455/522 |
| 2007/0093263 A1* | 4/2007 | Song et al. | 455/556.1 |
| 2007/0098107 A1* | 5/2007 | Choi et al. | 375/295 |
| 2009/0202010 A1* | 8/2009 | Fu et al. | 375/260 |
| 2009/0273492 A1* | 11/2009 | Yang et al. | 341/81 |
| 2010/0029265 A1* | 2/2010 | Khandekar et al. | 455/423 |
| 2011/0292811 A1* | 12/2011 | Tsai et al. | 370/241 |

FOREIGN PATENT DOCUMENTS

| | | |
|---|---|---|
| EP | 1856807 | 4/2010 |
| WO | WO 2006099528 A1 * | 9/2006 |

OTHER PUBLICATIONS

International Search Report and Written Opinion—PCT/US2010/048305, International Search Authority—European Patent Office—Nov. 23, 2010.

* cited by examiner

*Primary Examiner* — Jeffrey M Rutkowski
*Assistant Examiner* — Hardikkumar Patel
(74) *Attorney, Agent, or Firm* — Fulbright & Jaworski LLP

(57) ABSTRACT

A system for receiving data includes a receiver configured to receive a radio frequency communication signal comprising at least one superframe, the at least one superframe having at least a first data stream and a second data stream encoded therein, wherein the receiver decodes at least one of the first data stream and the second data stream.

33 Claims, 16 Drawing Sheets

500 → SystemParameters Message

| FIELD | LENGTH (BITS) |
|---|---|
| SYS_TIME | 32 |
| LP_SEC | 8 |
| LTM_OFF | 6 |
| DAY_LT | 1 |
| NetworkID | 16 |
| InfrastructureID | 16 |
| ProtocolVersion | 8 |
| MinProtocolVersion | 8 |
| MinMonitorCycleIndex | 4 |
| NumPPCSymbols | 2 |
| NumMACTimeUnits | 9 |
| DataMACTrailerLength | 4 |
| ControlMACHdrLength | 2 |
| StreamLayerTrailerLength | 4 |
| CCPHdrLength | 3 |
| ControlChannelTxMode_Field1 | 4 |
| ControlChannelTxMode_Field2 | 4 |
| ControlChannelAllocation | 3 |
| ControlChannelStartOffset | 9 |
| ControlChannelSlotInfo | 7 |
| ControlProtocolCapsuleID | 3 |
| NumControlSequencePairs | 3 |
| MLCRecordsTableAbsent | 1 |
| Reserved | 3 |

If MCLRecordsTableAbsent="0", include the following fields:

| FIELD | LENGTH (BITS) |
|---|---|
| StartMLC | 8 |
| NumMLCRecords | 8 |

If MCLRecordsTableAbsent="0", include NumMLCrecords of the following fields:

| FIELD | LENGTH (BITS) |
|---|---|
| MLCPresent | 1 |

If MCLPresent="1", include the following fields:

| FIELD | LENGTH (BITS) |
|---|---|
| StartOffset | 9 |
| SlotInfo | 7 |
| StreamLengths | 23 |

If MCLPresent="0", include the following fields:

| FIELD | LENGTH (BITS) |
|---|---|
| NextSuperframeOffset | 10 |
| FixedLengthReserved1 | 29 |

| FIELD | LENGTH (BITS) |
|---|---|
| StartExtendedMLC | 8 |
| NumExtendedMLCRecords | 8 |

Include NumExtendedMLCrecords of the following fields:

| FIELD | LENGTH (BITS) |
|---|---|
| ExtendedMLCPresent | 1 |

If ExtendedMLCPresent="1", include the following fields:

| FIELD | LENGTH (BITS) |
|---|---|
| StartOffset | 9 |
| Slotinfo | 7 |
| ExtendedStreamLengths | 25 |

If ExtendedMLCPresent="0", include the following fields:

| FIELD | LENGTH (BITS) |
|---|---|
| NextSuperframeOffset | 10 |
| FixedLengthReserved2 | 31 |

| FIELD | LENGTH (BITS) |
|---|---|
| MLC_ID | 8 |
| SystemParametersUpdateFlag | 1 |
| NextSuperframeOffsetFlag | 1 |
| Reserved | 6 |
| ContinueNextSuperframe | 1 |

If ContinueNextSuperframe = "1", include the following three fields

| FIELD | LENGTH (BITS) |
|---|---|
| NextSuperframeStartOffset | 9 |
| NextSuperframeSlotInfo | 7 |
| NextSuperframeStreamlengths | 23 |

If ContinueNextSuperframe = "0", include the following two fields

| FIELD | LENGTH (BITS) |
|---|---|
| NextSuperframeOffset | 10 |
| FixedLengthReserved | 29 |

| FIELD | LENGTH (BITS) |
|---|---|
| MLC_ID | 8 |
| SystemParametersUpdateFlag | 1 |
| NextSuperframeOffsetFlag | 1 |
| Reserved | 4 |
| ContinueNextSuperframe | 1 |

If ContinueNextSuperframe = "1", include the following three fields

| FIELD | LENGTH (BITS) |
|---|---|
| NextSuperframeStartOffset | 9 |
| NextSuperframeSlotInfo | 7 |
| NextSuperframeExtendedStreamlengths | 25 |

If ContinueNextSuperframe = "0", include the following two fields

| FIELD | LENGTH (BITS) |
|---|---|
| NextSuperframeOffset | 10 |
| FixedLengthReserved | 29 |

SYSTEM AND METHOD FOR THE SIMULTANEOUS RECEPTION OF FLO AND FLO-EV DATA

CROSS REFERENCE TO RELATED APPLICATION

This application claims priority to and the benefit of the filing date of U.S. Provisional Application No. 61/240,957, entitled "Method For Simultaneous Reception of FLO and FLO-EV Waveforms In a Device" filed on Sep. 9, 2009, the entirety of which is incorporated herein by reference.

BACKGROUND

The continued development and implementation of wireless communications systems has made it possible to transmit a large amount of data over a radio frequency (RF) air interface. There are a number of technologies that can be used to broadcast video and other programming from a central location to a receiver device. Forward Link Only (FLO) is an example of a transmission methodology that uses a radio frequency (RF) air interface to broadcast video and other programming from one or more central locations to one or more receiver devices. The basic structure of a transmission block in FLO is referred to as a "superframe." In one implementation, a superframe contains 1200 MAC time units and has a duration of one (1) second. A superframe contains pilot, control and data frames. Typically, four data frames, each containing one or both of wide-area and local-area data are part of a superframe.

The FLO methodology has been improved to increase bandwidth and data carrying capability. The enhanced FLO system is referred to as FLO-EV. The enhanced FLO-EV system introduced additional physical layer transmit modes and allows additional services and capacity to be carried on the FLO network. In addition, it is also possible to increase the bandwidth of such networks by using multiple radio frequency (RF) channels over which to transport the FLO and the FLO-EV data.

As used herein the term FLO transmitter and FLO receiver refers to transmitters and receivers that are compliant with Revisions 0 and A of TIA-1099. The term FLO-EV and FLO-EV receiver refers to transmitters and receivers that are compliant with Revision B of TIA 1099. In particular, a FLO-EV multicast logical channel (MLC) is an MLC that is compliant with Revision B of TIA 1099, but not compliant with earlier releases. A FLO-EV MLC is either a physical layer type 2 (PHY Type 2) MLC that is encoded with a turbo code that spans the bits in the 4 frames of a superframe, or a physical layer type 1 (PHY Type 1) MLC that is encoded similarly to Rev A of TIA-1099 but that has a different trailer and OIS (overhead information symbol) location record structure to allow a larger peak rate on the MLC.

However, the physical layer coding structure of FLO-EV is different from that of FLO, thereby introducing challenges when attempting to receive both FLO and FLO-EV data in a single device.

Therefore, it would be desirable to allow both FLO and FLO-EV data to be received and decoded by the same device.

SUMMARY

Embodiments of the invention include a system for receiving data, comprising a receiver configured to receive a radio frequency communication signal comprising at least one superframe, the at least one superframe having at least a first data stream and a second data stream encoded therein, wherein the receiver decodes at least one of the first data stream and the second data stream.

Other embodiments are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

FIG. 5 is a diagram illustrating the system parameters message (SystemParameters Message) carried in the wide area OIS (or local-area OIS) of FIG. 3.

FIGS. 6A through 6D are diagrams illustrating various additional fields of the SystemParameters Message of FIG. 5 as it relates to an MLC Records Table.

FIGS. 6E through 6H are diagrams illustrating various additional fields of the SystemParameters Message of FIG. 5 as it relates to an extended MLC Records Table.

FIGS. 8A through 8C are diagrams illustrating various additional fields of the SystemParameters Message of FIG. 5.

FIGS. 9A through 9C are diagrams illustrating various additional fields of the SystemParameters Message of FIG. 5.

DETAILED DESCRIPTION

Figure 1:
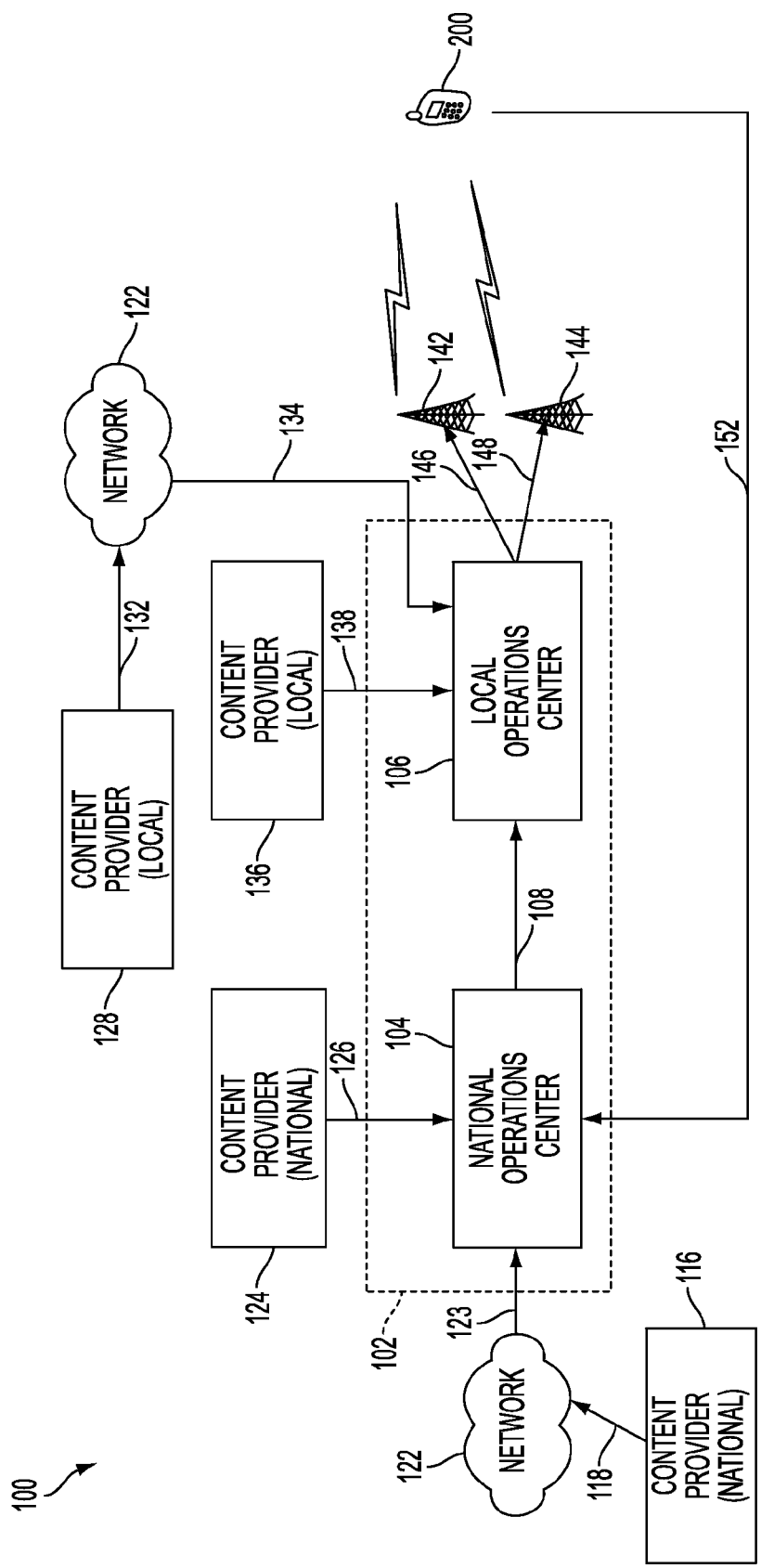
FIG. 1 is a block diagram illustrating the basic elements of a forward link only (FLO) network.

The system and method for the simultaneous reception of FLO and FLO-EV data will be described in the context of a receiver in a portable communication device having the ability to receive and discriminate between multiple data streams on a single radio frequency (RF) channel or on multiple RF channels.

The system and method for the simultaneous reception of FLO and FLO-EV data can be implemented in hardware, software, or a combination of hardware and software. When implemented in hardware, the system and method for the simultaneous reception of FLO and FLO-EV data can be implemented using specialized hardware elements and logic. When portions of the system and method for the simultaneous reception of FLO and FLO-EV data are implemented in software, the software can be used to control the various components in a receiver of a portable communication device.

The software can be stored in a memory and executed by a suitable instruction execution system (microprocessor). The hardware portion of the system and method for the simultaneous reception of FLO and FLO-EV data can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the system and method for the simultaneous reception of FLO and FLO-EV data comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1 is a block diagram illustrating the basic elements of a forward link only (FLO) network. The flow network 100 comprises a network operations center 102 one or more flow transmitters 142, 144, a reverse link 152 and one or more portable communication devices 200. In an embodiment, the network operations center 102 comprises a national operations center 104 and a local operations center 106. The national operations center 104 provides a national multiplex distribution stream over connection 108 to the local operations center 106. The connection 108 can be any high capacity communications channel.

The network operations center 102 receives content from a number of different sources over a number of different paths. Content may include, but is not limited to, data, audio, video, television programming, or other content. For example, the national operations center 104 can receive national content from a content provider 124 directly over a connection 126. The connection 126 can be a direct physical connection, a wireless connection or any other connection over which content can be provided to the national operations center 104. Alternatively, the national operations center 104 can receive national content from a content provider 116 over a network 122. The network 122 can be any of a wide area, a local area, or any other communications network over which content can be received over connection 118 from the content provider 116 and provided over connection 123 to the national operations center 104.

Similarly, the local operations center 106 can receive local content directly from a content provider 136 over connection 138. The connection 138 can be similar to the connection 126. Alternatively, the local operations center 106 can receive local content from a content provider 128 over the network 122 via connection 134. National content is content that can be provided to all portable communication devices 200, while local content is content that can be provided to a subset of all portable communication devices based on geographical location.

The network operations center provides the content to a wireless broadcast network embodied by transmitters 142 and 144. The transmitters 142 and 144 are intended to illustrate the entire infrastructure used to receive a terrestrial-based communication signal over connections 146 and 148, and to provide a wireless transmission to the portable communication device 200. While the details of the FLO network are known to those having ordinary skill in the art, it should be mentioned that the FLO network is a diversity-type network in which multiple transmitters (e.g., transmitters 142 and 144) are used to send multiple signals having identical content from a number of transmitters to each portable device 200. The portable communication device 200 comprises any mobile or portable communication device, such as, for example, a cell phone, a personal digital assistant (PDA), a wireless television receiver, or any other portable communication device. The portable communication device 200 includes a receiver configured to receive the FLO transmission from the transmitters 142 and 144. Further, it is possible for the transmission to occur from the transmitters 142 and 144 to the portable communication device 200 using more than one RF channel. As an example, FLO data can be carried over a first RF channel having a first radio frequency, FLO-EV data can be carried over a second RF channel having a second radio frequency, and both FLO and FLO-EV data can be carried on a third RF channel.

The portable communication device 200 is also coupled to the national operations center 104 via a reverse link 152. In an embodiment, the reverse link 152 can be a 3G, or a 4G wireless communication channel provided by a cellular communication carrier or provider. The reverse link 152 allows the portable communication device 200 to submit registration and authentication information to the national operations center 104 so that the portable communication device 200 receives the appropriate content. However, it should be mentioned that the transmission of content from the network operations center, via the FLO transmitters 142 and 144, to the portable communication device 200 are one way only.

Figure 2:
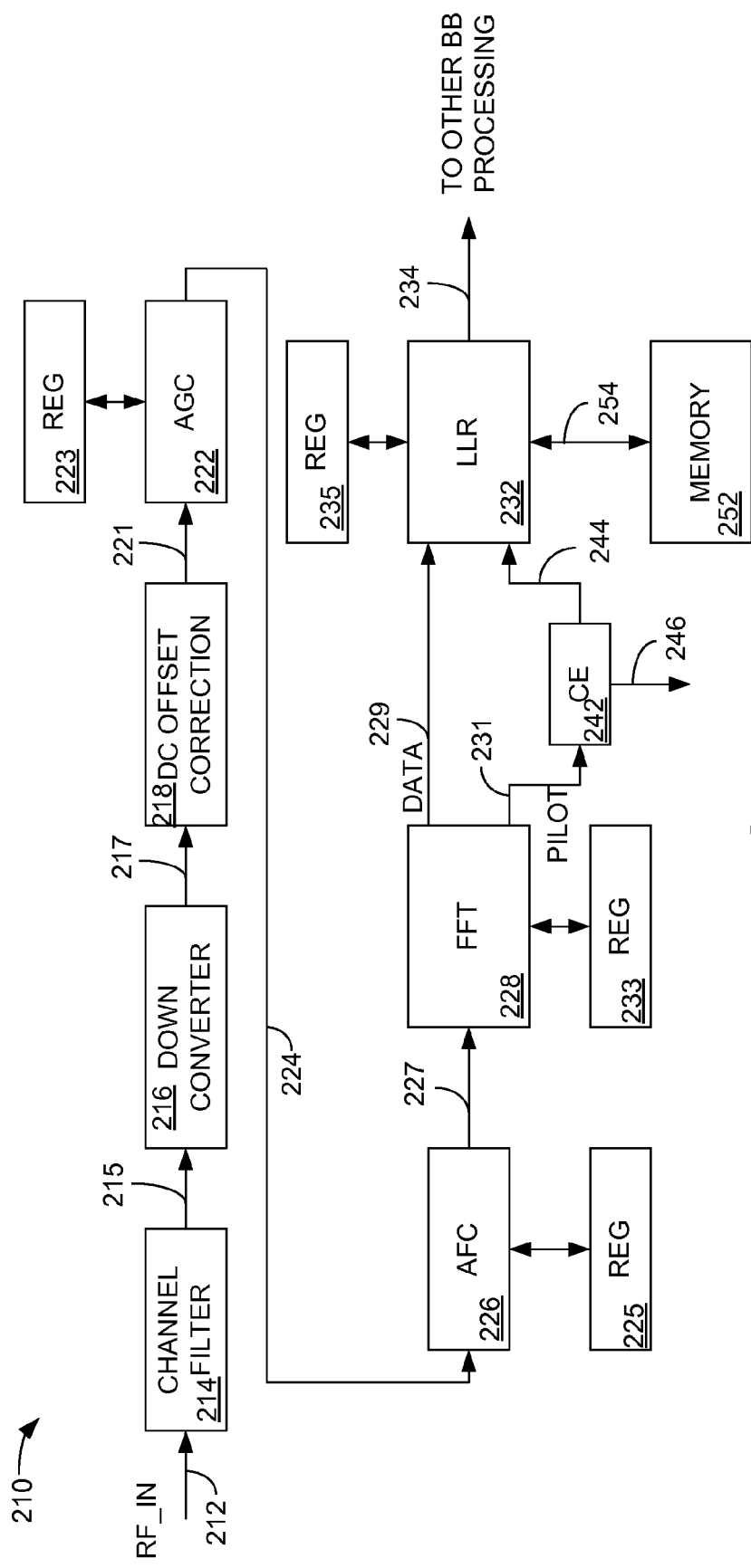
FIG. 2 is a block diagram illustrating a portion of a receiver of the portable communication device of FIG. 1.

FIG. 2 is a block diagram illustrating a portion of a receiver of the portable communication device 200 of FIG. 1. The receiver portion 210 shown in FIG. 2 illustrates only the basic components of a receiver within the portable communication device 200. Details of a receiver are known to those having ordinary skill in the art. The receiver portion 210 receives a radio frequency (RF) signal over connection 212. The received RF signal is provided to a channel filter 212, which filters the received RF signal to develop a signal on connection 215 at the desired receive frequency. The RF signal on connection 215 is an analog signal that has undergone initial receiver processing, which may also include one or more of switching, low noise amplification or other front end receiver processing to prepare the RF signal for decoding.

The signal on connection 215 is provided to a downconverter 216. The downconverter 216 translates the signal on connection 215 from an RF signal to either an intermediate frequency (IF) or to baseband, or near-baseband if the receiver is implemented as a direct conversion receiver.

The signal on connection 217 is provided to a DC offset correction element 218, which corrects for any DC offset imparted to the signal in connection 217. The output of the DC offset correction element 218 is provided over connection 221 to an automatic gain control (AGC) element 222. The AGC element 222 adjusts the gain of the signal on connection 221 and provides a gain adjusted signal on connection 224. The AGC element 222 may comprises one or more analog and/or digital gain stages and can also convert the analog signal on connection 221 to a digital signal on connection 224.

The output on connection 224 is provided to an automatic frequency control (AFC) element 226. The AFC element 226 stabilizes the frequency of the signal on connection 224 and provides an output over connection 227 to the FFT element 228. The FFT element 228 provides a data output over connection 229 and provides a pilot symbol output over connection 231.

The data output of the FFT element 228 on connection 229 is provided to a log likelihood ratio (LLR) generator 232, which performs signal processing to determine the accuracy of the received data stream, and provides the data output to a turbo decoding element (not shown), and other processing elements over connection 234. The pilot symbol signal provided on connection 231 is provided to a channel estimate (CE) element 242. The CE element 242 provides the pilot symbol and estimate of the channel energy for each symbol over connection 244 to the LLR generator 232 and also provides an estimate of the channel energy for each symbol over connection 246. A memory 252 is coupled to the LLR generator 232 over connection 254. The memory can be used to store the information on connections 229 and 244, and can be used to store the software for the system and method for signaling overhead information in a network.

Figure 3:
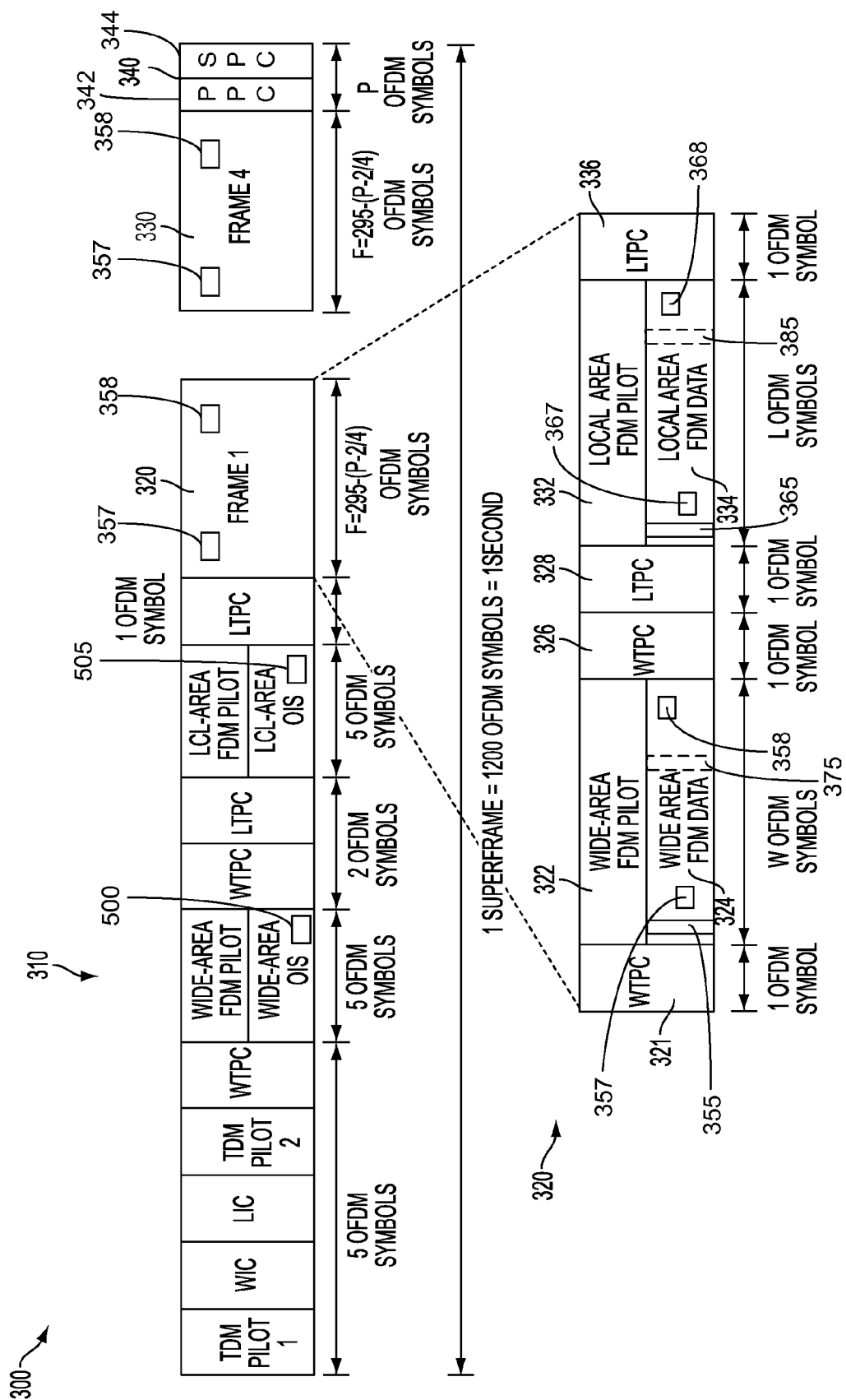
FIG. 3 is a block diagram illustrating an example of a superframe suitable for carrying FLO and FLO-EV data.

FIG. 3 is a block diagram illustrating an example of a superframe 300 suitable for carrying FLO and FLO-EV data over one or more RF channels. In an embodiment, the superframe 300 can be assembled by the network operations center 102 (FIG. 1) for transmission to the portable communication device 200 (FIG. 1). The superframe 300 comprises a preamble portion 310 that comprises pilot and OIS (overhead information symbol) information, frames 320 and 330, and portion 340, which includes positional pilot channel (PPC) 342 and signaling parameter channel (SPC) 344 as overhead information. The SPC 344 includes two bits that are used to indicate the physical device type (PHY Type 1 or PHY Type 2) for the particular radio frequency (RF), and includes two bits to indicate PPC status. By indicating the physical device type in the SPC 344 for the particular RF, the portable communication device 200 can determine whether it can receive and decode the contents of that particular RF.

The SPC 344 indicates a radio frequency (RF) type so that the portable communication device 200 uses the SPC 344 to set decoding registers prior to moving to a different RF channel. The decoding registers can be registers 223, 225, 233 and 235 associated with the AGC element 222, AFC element 226, FFT element 228 and LLR generator 232, respectively. Further, additional registers will be associated with other decoder processing elements (not shown).

The PPC 342 includes PPC presence bits that the portable communication device 200 uses to determine whether PPC symbols are broadcast on an RF channel prior to decoding the RF channel. The SPC bits and PPC presence bits are part of the control channel (in the ENDM message to be described below) as well as in the SPC 344. The portable communication device 200 received and decodes the control channel to determine whether a new RF contains a PPC channel that should be considered. Two (2) bits in the SPC 344 also indicate in the PPC 342 is present or absent in that particular RF channel on which the SPC 344 is carried.

The PPC status allows the portable communication device 200 to determine whether the PPC status information may be available on the current RF channel, thus allowing the portable communication device 200 to determine whether it can use the PPC information for location determination or another purpose without needing a turbo decoder for decoding the OIS SystemParameters message. In addition, the portable communication device 200 can read the OIS information 500 and determine whether PPC location information are broadcast or not. Although four (4) frames are included in a superframe 300, only frames one (1) and four (4) are shown in FIG. 3 for simplicity of illustration.

Furthermore, the PHY Type of an RF channel and PPC information can be listed in an extended neighbor description message (ENDM) (FIG. 7) to provide the device with prior knowledge of the encoding of other RF channels in the same local-area operational infrastructure (LOI), or of the RF channels in neighboring LOIs. An LOI is identified by the Infrastructure ID value (field 522 in FIG. 5) in the Local OIS. An LOI is the smallest geographic area over which the same set of multiplexed signals are broadcast over the exact same RF channels in the same manner. Thus, obtaining the ENDM and FDM and EFDM in the current LOI is sufficient to determine on which RF channel a flow is broadcast in the current LOI. The ENDM carries the mapping between RF_IDs used in the FDM and EFDM to identify RF channels, and physical RF channels characterized by the SPC parameters. The same content may be broadcast in two neighboring LOIs. If such is the case, then the LOI ID is a geographical identifier and can be used, for example, to determine whether certain channels are blacked out. Details of the fields in an ENDM are shown below.

The preamble 310 comprises 18 OFDM symbols, e.g., in 4K FFT mode in which TDM pilot channels occupy the first four symbols and a wide area transition pilot channel (WTPC) occupies the fifth symbol. The next five symbols are divided among wide area FDM pilot and wide area OIS information. The wide area OIS information portion includes a system parameters message 500, which will be described in greater detail below. The following two symbols comprise wide area transition pilot channel (WTPC) information and local area transition pilot channel (LTPC) information, while the following five symbols are divided between local area FDM pilot information and local area OIS information. The local area OIS information portion also includes a system parameters message 505, similar to the systems parameter message 500, for local OIS information. The following symbol comprises a local area transition pilot channel (LTPC).

Frames one through four are similar in structure so only frame one, 320, will be described in detail. Frame one, 320, comprises a wide area transition pilot channel (WTPC) 321 occupying a first symbol, "W" symbols comprising wide area FDM pilot information 322 and wide area FDM data 324, a single OFDM symbol comprising WTPC information 326, a single OFDM symbol comprising LTPC information 328, "L" OFDM symbols comprising local area FDM pilot information 322 and local area FDM data 334, followed by a single OFDM symbol 336 comprising the LTPC.

The superframe 300 can comprise both wide area and local area data, depending on system application. Further, in an embodiment, the superframe 300 can comprise both FLO and FLO-EV data. A FLO-EV multicast logical channel (MLC) is an MLC that is compliant with Revision B of TIA 1099, but not compliant with earlier releases. A FLO-EV MLC is either a physical layer type 2 (PHY Type 2) MLC that is encoded with a turbo code that spans the bits in the 4 frames of a superframe, or a physical layer type 1 (PHY Type 1) MLC that is encoded similarly to Rev A of TIA-1099 but that has a different trailer and OIS (overhead information symbol) location record structure to allow a larger peak rate on the MLC. A device capable of receiving PHY type 1 is able to decode transmit modes specific to PHY Type 1 transport. Similarly, a device capable of receiving PHY type 2 is able to decode transmit modes specific to PHY Type 2 transport. A PHY Type 1 transmit mode carries the data in what is referred to as a PHY Type 1 multicast logical channel (MLC) and a PHY Type 2 transmit mode carries the data in a PHY type 2 MLC. The term "transmit mode" refers to the transmit scheme used to send information from the transmitters 142, 144, to the portable communication device 200 (FIG. 1). A PHY Type 1 transmit mode generally uses a first set of RF carrier frequencies and a PHY Type 2 transmit mode generally uses a second set of RF carrier frequencies.

A PHY Type 1 transmit mode may be used to send the superframe 300 containing FLO data to a portable communication device 200; a PHY Type 2 transmit mode may used to send the superframe 300 containing FLO-EV data to a portable communication device 200; and PHY Type 1 and PHY Type 2 transmit modes may be used to send the superframe 300 containing FLO data and FLO-EV data to a portable communication device 200. Further, FLO data and FLO-EV data can be transported in the same superframe or in different superframes, only FLO data can be transported in a superframe, and only FLO-EV data can be transported in a superframe.

A portable communication device 200 can be implemented in a variety of ways to receive any or all of FLO and FLO-EV data in either or both of a PHY Type 1 transmit mode or a PHY Type 2 transmit mode, whether in the same superframe or in different superframes. In an embodiment, and for example purposes only, the portable communication device 200 can be considered a class 1 device that can receive and decode FLO data; a class 2 device that can receive and decode FLO-EV data; a class 3 device that can receive and decode FLO data and FLO-EV data in separate superframes, i.e., the device can either decode the FLO data being broadcast or the FLO-EV data being broadcast, but not both, in one superframe; and a class 4 device that can receive and decode FLO data and FLO-EV data in the same superframe. Further, it is also possible that an implementation may be such that the PHY Type 1 and PHY Type 2 transmit modes may occur over the same or different frequencies.

There is typically no restriction on the location of FLO (PHY Type 1 device and MLC) and FLO-EV (PHY Type 2 device and MLC) and either or both of PHY Type 1 transmit modes and PHY Type 2 transmit modes. Corresponding MLCs may be carried anywhere within the wide area FDM data portion 324. Similarly, either or both of PHY Type 1 transmit modes and PHY Type 2 transmit modes, and corresponding MLCs, may be carried anywhere within the local area FDM data portion 334.

The wide area FDM data portion 324 comprises a control channel (CC) multicast logical channel (MLC) 355, and for example purposes only, comprises a FLO MLC 357 and a FLO-EV MLC 358. Similarly, the local area FDM data portion 334 comprises a control channel (CC) multicast logical channel (MLC) 365, and for example purposes only, comprises a FLO MLC 367 and a FLO-EV MLC 368. Control information associated with the CC MLC 355 is delivered to the wide service area over a plurality of radio frequency channels is identical regardless of transmit mode. Similarly, control information associated with the CC MLC 365 that is delivered to the local service area over a plurality of radio frequency channels is identical regardless of transmit mode.

In addition, the wide area FDM data portion 324 may optionally include a wide area FLO-EV CC MLC 375; and the local area FDM data portion 334 may optionally include a local area FLO-EV CC MLC 385. The inclusion of a wide area FLO-EV CC MLC 375 and a local area FLO-EV CC MLC 385 allows a control channel to be sent in a network that includes both PHY Type 1 devices and PHY Type 2 devices, and in a network that includes only PHY Type 2 devices. Furthermore, this embodiment is compatible with the first 3 classes of devices mentioned above, since a device would always be able to decode updates to the control channel to enable continued reception of data flows.

Figure 4:
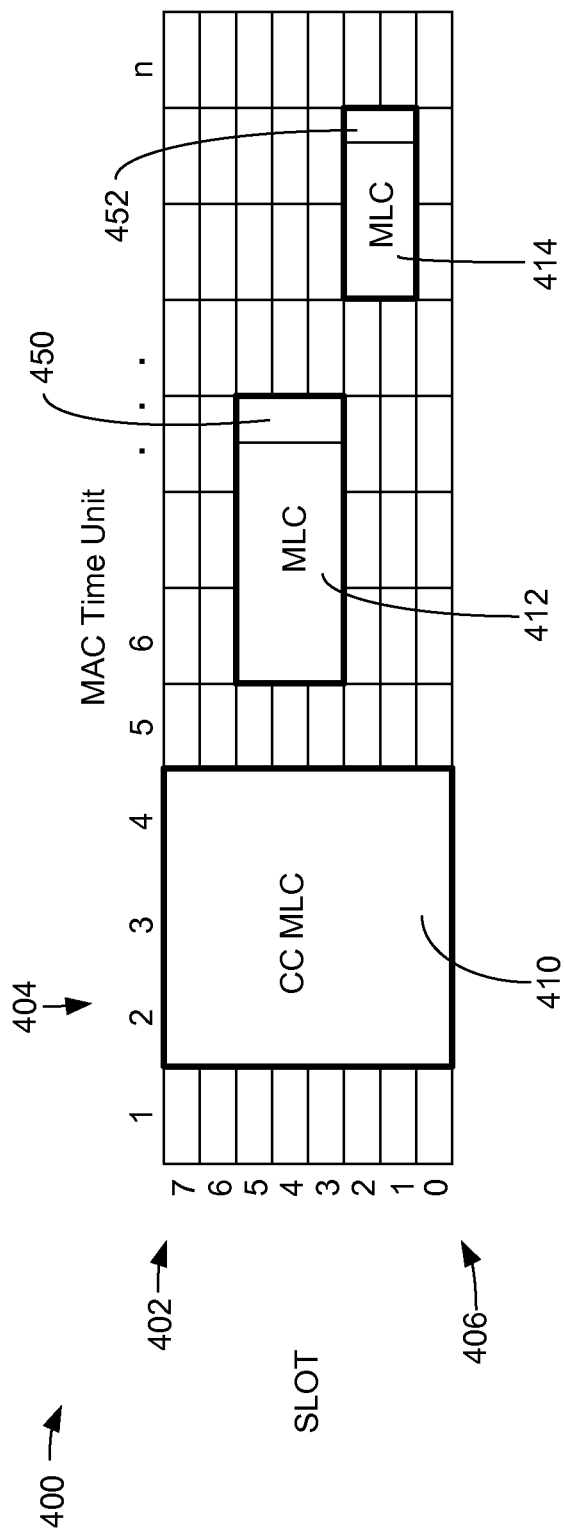
FIG. 4 is a graphical illustration showing a frame portion containing example multicast logical channels.

FIG. 4 is a graphical illustration 400 showing a frame portion 402 containing example multicast logical channels. The frame portion 402 can be part of either the wide area FDM data portion 324 (FIG. 3) or the local area FDM data portion 334 (FIG. 3). The frame portion 402 comprises a number ("W" or "L" of FIG. 3, depending on whether the subject frame contains wide area or a local area data) of symbols that can occur, for example, within the data portion 324 or 334 of the frame 320 of FIG. 3. The frame portion 402 contains a number of MAC time units 404, which are each further subdivided into eight (8) slots 406. Each slot is further mapped to an interlace, which is a physical layer concept representing a set of ⅛ subcarriers spaced regularly across the FFT bandwidth. In one implementation, this mapping may be designed such that the data sent over an MLC experiences significant frequency diversity. In general, one MAC time unit is either ½ (if FFT=8K), 1 (if FFT=4K), 2 (if FFT=2K) or 4 (if FFT=1 K) OFDM symbols. A MAC time unit may be spread over multiple OFDM symbols. Each MLC is mapped to MAC time units.

For example purposes only, a control channel (CC) multicast logical channel (MLC) 410 is shown as spanning MAC time units 2, 3 and 4, and occurs within all of the slots 406.

For example purposes only, a first multicast logical channel (MLC) 412 is shown as spanning MAC time units 6, 7 and 8, and as occurring within slots 3-5. A second exemplary MLC 414 is shown as spanning MAC time units n−2 and n−1, and occurs within slots 1 and 2. The MLCs 412 and 414 can be either a FLO (PHY Type 1) MLC or a FLO-EV (PHY Type 2) MLC, and include a MAC trailer. For example, the MLC 412 includes a MAC trailer 450 and the MLC 414 includes a MAC trailer 452. The MAC trailer (450 and 452) may include a portion of the information carried in the system parameters message (500, 505) provided in the OIS (FIG. 3).

This so called "embedded OIS" allows the decoding of an MLC in a subsequent superframe without decoding the OIS in the subsequent superframe. The subsequent superframe may be the next immediate superframe (e.g., for a FLO MLC), or a second subsequent superframe (e.g., for a FLO-EV MLC), as described in commonly-assigned U.S. Utility patent application Ser. No. 12/876,958, entitled "SYSTEM AND METHOD FOR SIGNALING OVERHEAD INFORMATION IN A NETWORK", filed on Sep. 7, 2010, the entire disclosure of which is incorporated herein by reference.

FIG. 5 is a diagram illustrating the system parameters message (SystemParameters Message) 500 carried in the wide area OIS (and 505 when carried in the local-area OIS) of FIG. 3. The SystemParameters Message comprises a number of information fields that define FLO and FLO-EV data, carried by PHY Type 1 and PHY Type 2 transmit modes, respectively, and that can also indicate the radio frequency (RF) information for different transmit modes. As an example, to support the availability of both FLO and FLO-EV data, the fields 510 are modified from that used in deployments with only PHY Type 1 transmit modes to accommodate a PHY Type 2 transmit mode as well. Previously, when carrying only a PHY Type 1 MLC, the field 512 referred to the transmit mode (modes 0 to 11, where modes 12 to 15 are unused), and the field 514 was the outer-code mode (0000=no outer code, 1=14/16, 2=12/16, 3=8/16). This arrangement still applies if the subject MLC is PHY Type 1. If the subject MLC is a PHY Type 2 MLC, then the field 514 contains the 4 most significant bits of the 8 bit PHY Type 2 transmit mode, and the field 512 contains the 4 least significant bits of the 8 bit PHY Type 2 transmit mode. The following values of {field2}{field1} (field 514/field 512) are in use: {0000}{0000-1011} (i.e. values 0 to 11 indicating PHY Type 1 modes 0 to 11 with no outer code), {0001}{0000-1011} (i.e. values 16 to 27 indicating PHY Type 1 modes 0 to 11 with RS(14,16) outer code), {0010}{0000-1011} (i.e. values 32 to 43 indicating PHY Type 1 modes 0 to 11 with RS(12,16) outer code), {0011} {0000-1011} (i.e. values 48 to 59 indicating PHY Type 1 modes 0 to 11 with RS(8,16) outer code). This is the reason that PHY Type 2 transmit modes start at 64. It is possible to have filled the numerical gaps and used modes 12, 13, 14, 15, 28, 29, etc., but such would be less practical from a usability point of view. Therefore, possible combinations include FLO=>PHY Type 1 transmit modes, and new combinations for the two fields=>8 bit transmit mode numbers (PHY Type 2 modes are 64 to 72, and 80 to 91).

The field 512 comprises four (4) available bits for ControlChannelTXMode_Field1 information and the field 514 comprises four (4) available bits for ControlChannelTXMode_Field2 information. By including the fields 512 and 514, the SystemParameters Message 500 can signal to the receiver 210 within the portable communication device 200, a specific transmit mode that can support FLO and/or FLO-EV data. For example, the fields 512 and 514 can be used to carry information relating to a physical type 1 transmit mode that carries a first type MLC (PHY Type 1 MLC) or the fields 512 and 514 can be used to carry information relating to a physical type 2 transmit mode that carries a second type MLC (PHY type 2 MLC). A PHY Type 1 MLC and a PHY Type 2 MLC can be carried on the same RF channel or on different RF channels. In still another embodiment, a new field could be added to signal the presence of a second control channel with the understanding that the two control channels would carry the same data, but that one control channel would use a PHY Type 1 transmit mode for FLO devices, and that the second control channel would use a PHY type 2 transmit mode for a) greater coverage, and/or b) ability of devices decoding PHY Type 2 MLCs to simultaneously decode the control channel without requiring the receiver to be able decode PHY Type 1 and PHY Type 2 MLCs simultaneously.

The SystemParametersMessage 500 also includes a minimum protocol version (MinProtocolVersion) field 516 and a Protocol Version field 518. The field 516 is used to signal the minimum protocol version specified for the portable communication device 200 to receive a particular flow. For example, when the control channel MLC is sent using a transmit mode associated with FLO data (PHY Type 1) the MinProtocolVersion field 516 can be set to a logic "0" indicating that all devices can decode and interpret the OIS and the control channel. When the control channel MLC is sent using a transmit mode associated with FLO-EV data (PHY Type 2) the MinProtocolVersion field 516 can be set to a logic "2" indicating that PHY Type 1 devices cannot decode and interpret the OIS and the control channel.

The SystemParametersMessage 500 also includes a protocol version (ProtocolVersion) field 518. The field 518 is used to signal the current version of the Forward Link Only system protocol supported by the infrastructure. For example, in deployments where OIS and control channel are signaled using a PHY Type 1 transmit mode, and the data MLCs are sent using both PHY Type 1 and PHY Type 2 transmit modes, field 516 of the SystemParametersMessage 500 may be set to "0" and field 518 may be set to "2".

The field 520, referred to as MLCRecordsTableAbsent, comprises a length of one bit, and is used to inform the receiver 210 whether the superframe 300 carries an MLC records table.

FIGS. 6A through 6D are diagrams illustrating various additional fields of the SystemParameters Message of FIG. 5 as it relates to an MLC Records Table. In an embodiment, the additional fields can be added to an MLC in what is referred to as a "MAC trailer." The diagram 600 illustrates a case where if the MLCRecordsTableAbsent field 520 (FIG. 5) is equal to logic "0", then a StartMLC field having a length of eight (8) bits and a NumMLCRecords field having a length of eight (8) bits are included. When backward compatibility from a PHY Type 2 device to a PHY Type 1 device is desired, the StartMLC field, the NumMLCRecords field, and an MLC Records Table (FIG. 7) should always be present, and the MLCRecordsTableAbsent field 520 should be set to "0". This bit may be set by the infrastructure in deployments with the minimum protocol version (field 516) set to "2".

FIG. 6B shows a diagram 610 illustrating a case where if the MLCRecordsTableAbsent field 520 is equal to a logic "0", then the NumMLCRecords of the field 615 (MLCPresent) is included. The field 615 has a length of one bit.

FIG. 6C shows a diagram 620 illustrating a case where if the MLCPresent field 615 (FIG. 6B) is equal to logic "1", then the following fields are included: StartOffset, having a length of nine (9) bits; SlotInfo, having a length of seven (7) bits; and StreamLengths, having a length of 23 bits.

FIG. 6D shows a diagram 630 illustrating a case where if the MLCPresent field 615 (FIG. 6B) is equal to logic "0", then the following fields are included; NextSuperframeOffset field 635, having a length of 10 bits; and FixedLengthReserved1, having a length of 29 bits.

FIGS. 6E through 6H are diagrams illustrating various additional fields of the SystemParameters Message of FIG. 5 as it relates to an extended MLC Records Table.

FIG. 6E shows a diagram 640 illustrating an extended MLC Records table header including the following fields. StartExtendedMLC, having a length of eight (8) bits; and NumextendedMLCrecords, having a length of eight (8) bits.

FIG. 6F shows a diagram 650 illustrating a case where the NumExtendedMLCRecords of the following fields are included: ExtendedMLCPresent field 655, having a length of one (1) bit.

FIG. 6G shows a diagram 660 illustrating a case where if the ExtendedMLCPresent field 655 in FIG. 6F is equal to logic "1", then the following fields are included: StartOffset, having a length of nine (9) bits; SlotInfo, having a length of seven (7) bits; and ExtendedStreamLengths, having a length of 25 bits. The ExtendedStreamLengths field 665 is made 2 bits longer than the StreamLengths field of FIG. 6C to allow a maximum number of packets on a larger stream that is 4 times greater than in the StreamLengths field. Further, the ExtendedStreamLengths field could be even longer (with no loss of generality) to increase the peak rate on medium and small streams as well.

FIG. 6H shows a diagram 670 illustrating a case where if the ExtendedMLCPresent field 655 in FIG. 6F is equal to logic "0", then the following fields are included: NextSuperframeOffset, having a length of 10 bits; and FixedLengthReserved, having a length of 31 bits.

Figure 7:
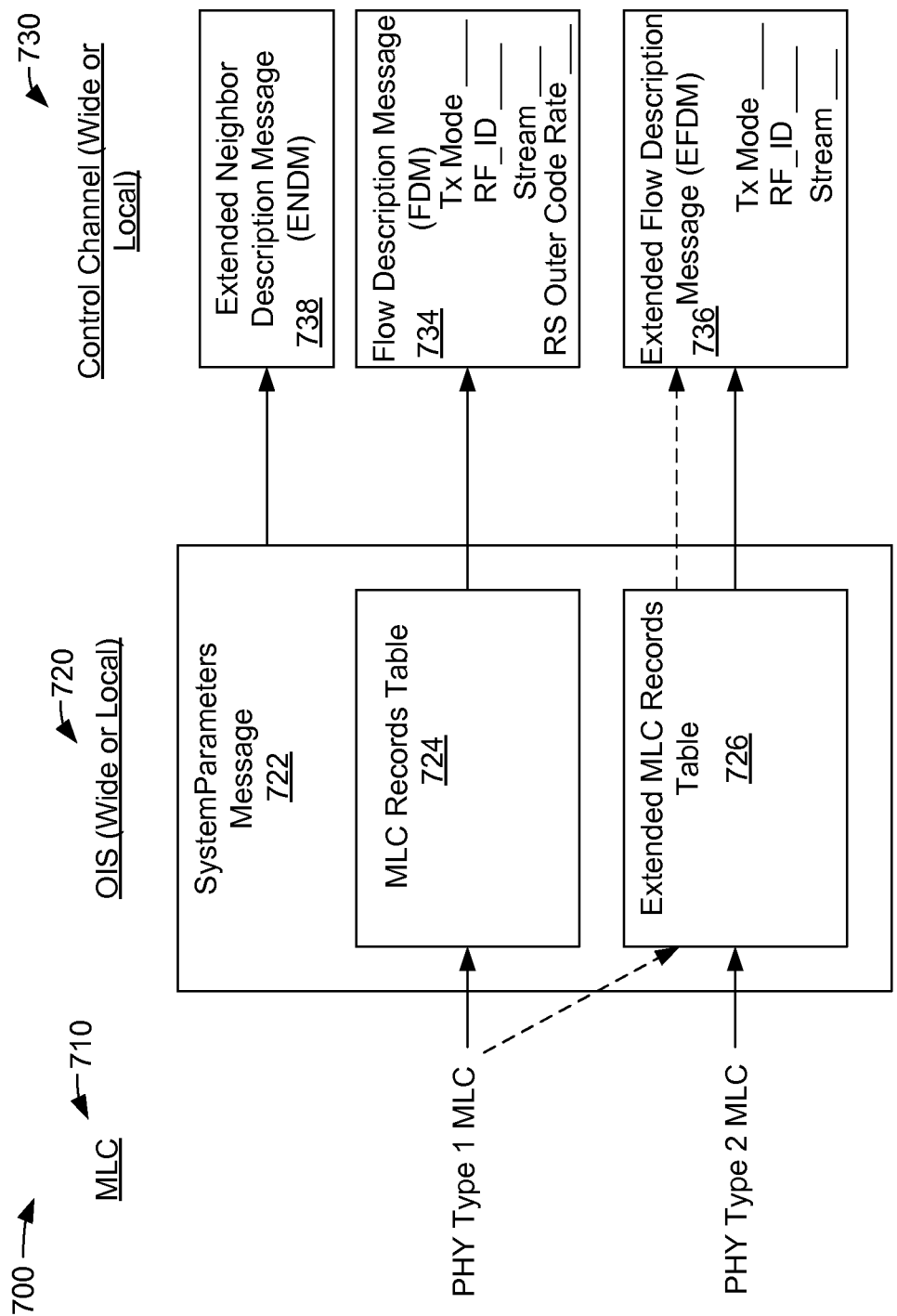
FIG. 7 is a block diagram illustrating the relationship among an MLC, the OIS, and the control channel (CC).

FIG. 7 is a block diagram 700 illustrating the relationship between an MLC, the OIS, and the control channel (CC). An MLC is generally shown using reference 710, the OIS is generally shown using reference 720 and the control channel is generally shown using reference 730.

In this example, the MLC 710 can be one of a physical type 1 MLC (PHY Type 1 MLC) or a physical type 2 MLC (PHY Type 2 MLC). In an embodiment, a portable communication device 200 that is capable of receiving a FLO transmission is only capable of decoding PHY Type 1 MLCs encoded using the protocols defined in Rev. 0 and A of TIA-1099. A portable communication device 200 that is capable of receiving a FLO-EV transmission is capable of decoding PHY Type 2 MLCs encoded using the protocols defined in Rev. B of TIA-1099. Further, it is possible that a single portable communication device 200 can be capable of receiving and decoding both a PHY Type 1 MLC and a PHY Type 2 MLC. Further still, it is possible that a single portable communication device 200 can be capable of receiving and decoding only a PHY Type 1 MLC, in which case all PHY Type 2 MLCs should be ignored. Moreover, it is possible that a single portable communication device 200 can be capable of receiving and decoding both a PHY Type 1 MLC and a PHY Type 2 MLC but not within the same superframe. Further, it is possible that a single portable communication device 200 can be capable of receiving and decoding a PHY Type 1 MLC, associated with a longer stream length (and thus higher peak rate), thus using the new trailer structure and the extended location table structure in OIS as defined in TIA 1099 Rev. B.

The OIS 720 is shown as including SystemParameters Message 722. The SystemParameters Message 722 is similar to the SystemParameters Message 500 described above. However, the SystemParameters Message 722 is illustrated in FIG. 7 as including an MLC Records Table 724 and an Extended MLC Records Table 726.

The MLC Records Table 724 includes the MLC location information of all flows listed in the Flow Description Message (FDM) 734. Similarly, the Extended MLC Records Table 726 includes the MLC location information of all flows listed in the Extended Flow description Message (EFDM) 736. If only PHY Type 2 flows are broadcast, then all MLC location information will be carried in the EFDM 736. The FDM 734 and the FDM 736 also include information, such as for example, Tx_Mode, RF_ID, Stream number, RS Outer Code Rate (if applicable for PHY Type 1 transmit mode), and other attributes of the respective data stream identified in the FDM 734 and/or EFDM 736.

The FDM 734 includes the flow description of all flows that are assigned to MLCs with transmit modes 0 through 4 and 6 through 11 and whose MLC locations are listed in the MLC Records Table 724. Similarly, the EFDM 736 includes the flow description of all flows that are assigned to MLCs with transmit modes 0 through 4 and 6 through 11 and whose MLC locations are listed in the Extended MLC Records Table 726; and includes the flow description of all flows that are assigned to MLCs with transmit modes 64 through 72 (regular) and 80 through 91 (layered) and whose MLC locations are listed in the Extended MLC Records Table 726. Any MLC_ID listed in the EFDM 736 will be in the extended MLC Records Table 726.

It is also possible to describe a PHY Type 1 MLC in the EFDM 736 and in the extended MLC Records Table 726. This is indicated in FIG. 7 using dotted lines to indicate that it is optional. Describing a PHY Type 1 MLC in the EFDM 736 and in the extended MLC Records Table 726 takes advantage of the higher peak rate available with a PHY type 2 transmit mode. Furthermore, such MLCs would use the same MAC trailer syntax as a PHY Type 2 MLCs to be able to carry the longer length fields as defined in the extended MLC records table 726.

The flows described in the FDM 734 are decodable by PHY Type 1 devices and by PHY Type 2 devices. The flows described in the EFDM 736 are decodable by PHY Type 2 devices only.

The Extended Flow Description Message 736 is readable only by a portable communication device 200 configured to receive FLO-EV data.

Control channel information for accessing the FLO data stream is placed in the FDM 734 and the control channel information for accessing the FLO-EV data stream is placed in the EFDM.

The control channel 730 also includes an Extended Neighbor Description Message (ENDM) 738. The ENDM 738 contains the exact frequency that corresponds to their RF_ID (radio frequency identifier) of the control channel, and all the MLCs contained within the FDM 734 and the EFDM 736. Moreover, the ENDM 738 can correspond to either or both of a wide control channel (CC) MLC or a local control channel (CC) MLC.

The locations of FLO and FLO-EV MLCs within the superframe can be placed in either the MLC Record Table 724, or in the extended MLC Records Table 726. A reason for segregating the MLCs in the SystemParameter message 722 with respect to the MLC Record Table 724 and the extended MLC Records Table 726 is that such separation aids transmission security and allows a clear design demarcation. The segregation scheme is done at the control channel level and thus a FLO device will never attempt to capture an MLC_IDs that carries FLO-EV data.

It is possible that a single portable communication device 200 can be capable of receiving both a PHY Type 1 MLC and a PHY Type 2 MLC on one, two or more different RF channels.

A number of possibilities exist for the transport of FLO and FLO-EV data over one or more RF channels. For example, it is possible for an RF channel to either transmit FLO data or FLO-EV data. This arrangement has a relatively low implementation complexity, but requires that a network transition from FLO data to FLO-EV data occur on an RF by RF basis.

Another implementation option is to allow a number of different RF channels to each transport both FLO data and FLO-EV data. In such an implementation, all of the control channels could be transported using FLO transmit modes, or control channels could be sent simultaneously using both FLO and FLO-EV transmit modes.

Another implementation option is to allow a number of different RF channels to transport FLO-EV data only.

Either a single control channel or dual control channels (where one control channel is transported using a PHY type 1 transmit mode and the other control channel is transported using a PHY type 2 transmit mode) can be transported.

In a single control channel implementation, the wide area control channel MLC and the local area control channel MLC will be carried on the same RF channel.

The wide area or local area FDM (e.g., 734 of FIG. 7) will carry the flow description of all wide area and local area flows carried by PHY Type 1 MLCs whose MLC locations are listed in the MLC records tables (e.g., 724 of FIG. 7) in the wide area and local area OIS.

The wide area or local area EFDM (e.g., 736 of FIG. 7) will carry the flow description of all wide area and local area flows carried by PHY Type 2 MLCs whose MLC locations are listed in the Extended MLC records tables (e.g., 7226 of FIG. 7) in the wide area and local area OIS.

In a dual control channel implementation, the wide area control channel MLC and the local area control channel MLC for FLO data will be carried on an RF channel compliant with a PHY Type 1 device and the wide area control channel MLC and the local area control channel MLC for FLO-EV data will be carried on an RF channel compliant with a PHY Type 2 device.

If a portable communication device 200 receives OIS information that is out of range, but that can be processed by the device, the device should treat that OIS as an OIS erasure and should then scan other RF channels for another decodable OIS.

A device receiving a PHY Type 1 MLC will read the FDM 734 and only recognize RF_IDs carrying FLO (PHY type 1) MLCs. Thus, these devices will not attempt to decode FLO-EV data, or a PHY Type 2 RF channel. Thus, a device receiving a PHY type 1 MLC (FLO) will implicitly stay on a PHY Type 1 or a mixed PHY Type 1 and PHY type 2 RF channel.

A device receiving a PHY Type 2 MLC will read the EFDM 736 and only recognize RF_IDs carrying FLO-EV (PHY type 2) MLCs. Thus, these devices will not attempt to decode FLO data, or a PHY Type 1 RF channel. Thus, a device receiving a PHY type 2 MLC (FLO-EV) will implicitly stay on a PHY Type 2 RF channel.

In case a device moves to a PHY Type 2 RF channel due to an interruption, such as an "out of coverage" period then reacquisition (or due to moving to another wide-area operational infrastructure (WOI)/local-area operational infrastructure (LOI)), then the device may scan a PHY Type 2 only RF channel. In this case, the device would continue to look for a FLO signal on other RF channels and treat the current RF channel as if there was no signal.

If a device finds only one RF channel in the FDM message, then the device assumes that it is on a single frequency network (SFN). In such an instance, the device would only assume that this is an SFN (or pseudo SFN for FLO devices ignoring FLO-EV RF channels), if the FDM message refers to only one RF_ID and simultaneously the MLC Records Table 724 is not empty. This condition will indicate that there is only a single RF channel carrying FLO MLCs, and that the subject RF channel is the current RF channel.

FIGS. 8A through 8C are diagrams illustrating various additional fields of the SystemParameters Message 500 of FIG. 5. The terminology "Future" to describe certain fields in FIGS. 8A through 9C is used interchangeably with the terminology "Next" used to describe certain fields in FIGS. 6A through 6H. Devices that are denoted as PHY Type 2 devices may require a longer decoding time than PHY Type 1 devices. Therefore, the media access control (MAC) layer trailer may not be decoded in sufficient time to allow for decoding the MLC in a subsequent superframe. The diagram 810 illustrates an additional MAC trailer added to the SystemParameters Message 500 of FIG. 5. The diagram 810 shows an additional field 812, referred to as ContinueNextSuperframe (ContinueFutureSuperframe for FLO-EV), having a length of one (1) bit. The field 812 signals that the MAC trailer location information for the MLC is for the superframe whose start time is 2 seconds after the start time of the superframe in which the trailer appears.

FIG. 8B is a diagram 820 illustrating a case where if the ContinueNextSuperframe field 812 (ContinueFutureSuperframe for FLO-EV) is equal to logic "1", then a NextSuperframeStartOffset (FutureSuperframeStartOffset for FLO-EV) field having a length of nine (9) bits; a NextSuperframeSlotInfo (FutureSuperframeSlotInfo for FLO-EV) field having a length of seven (7) bits; and a NextSuperframeStreamlengths (FutureSuperframeStreamlengths for FLO-EV) field having a length of 23 bits are included, such that the MAC trailer location information for the MLC is for the superframe whose start time is 2 seconds after the start time of the superframe in which the trailer appears.

FIG. 8C is a diagram 830 illustrating a case where if the ContinueNextSuperframe (ContinueFutureSuperframe for FLO-EV) field 812 is equal to logic "0", then a NextSuperframeOffset (FutureSuperframeOffset for FLO-EV) field having a length of 10 bits; and a FixedLengthReserved field having a length of 29 bits are included, such that the MAC trailer location information for the MLC is for the superframe whose start time is 1 second after the start time of the superframe in which the trailer appears.

FIGS. 9A through 9C are diagrams illustrating various additional fields of the SystemParameters Message 500 of FIG. 5. FIGS. 9A through 9C are similar to FIGS. 8A through 8C, but include fewer reserved bits and additional Streamlength bits for FLO-EV data. Devices that are denoted as PHY Type 2 devices may require a longer decoding time than PHY Type 1 devices. Therefore, the media access control (MAC) layer trailer may not be decoded in sufficient time to allow for decoding the MLC in a subsequent superframe. The diagram 910 illustrates an additional MAC trailer added to the SystemParameters Message 500 of FIG. 5. The diagram 910 shows an additional field 912, referred to as ContinueNextSuperframe (ContinueFutureSuperframe for FLO-EV), having a length of one (1) bit. The field 812 signals that the MAC trailer location information for the MLC is for the superframe whose start time is 2 seconds after the start time of the superframe in which the trailer appears.

FIG. 9B is a diagram 920 illustrating a case where if the ContinueNextSuperframe (ContinueFutureSuperframe for FLO-EV) field 912 is equal to logic "1", then a NextSuperframeStartOffset (FutureSuperframeStartOffset for FLO-EV) field having a length of nine (9) bits; a NextSuperframeSlotInfo (FutureSuperframeSlotInfo for FLO-EV) field having a length of seven (7) bits; and a NextSuperframeExtendedStreamlengths (Future SuperframeExtendedStreamlengths for FLO-EV) field 922 having a length of 25 bits are included, such that the MAC trailer location information for the MLC is for the superframe whose start time is 2 seconds after the start time of the superframe in which the trailer appears. The NextSuperframeExtendedStreamlengths (Future SuperframeExtendedStreamlengths for FLO-EV) field 922 includes two additional bits than does the NextSuperframeStreamlengths (FutureSuperframeStreamlengths for FLO-EV) field 822 of FIG. 8B.

FIG. 9C is a diagram 930 illustrating a case where if the ContinueNextSuperframe (ContinueFutureSuperframe for FLO-EV) field 912 is equal to logic "0", then a NextSuperframeOffset (FutureSuperframeOffset for FLO-EV) field having a length of 10 bits; and a FixedLengthReserved field having a length of 29 bits are included, such that the MAC trailer location information for the MLC is for the superframe whose start time is 1 second after the start time of the superframe in which the trailer appears.

It is desirable to allow the receiver (e.g., the receiver 210 in FIG. 2) in the portable communication device 200 to be implemented in a variety of configurations. For example, it may be desirable to implement the receiver such that one or more RF channels can be received. A network implementation in which more than one RF channel can be received is referred to as a so-called "multi-frequency network." In such a multi frequency network, FLO data and/or FLO-EV data can be received over one or more RF channels, where FLO data can be received on a first RF channel, FLO-EV data can be received on a different RF channel, or FLO and FLO-EV data can be received simultaneously on the same or on different RF channels.

A number of receiver configurations are shown below in FIGS. 10 through 13 making it possible to receive both FLO data and FLO-EV data in the same RF channel or on different RF channels. For example, a receiver 210 could switch to the desired frequency for FLO (or FLO-EV), generate LLR data and then switch back to the original frequency and generate LLR data for the other technology.

Figure 10:
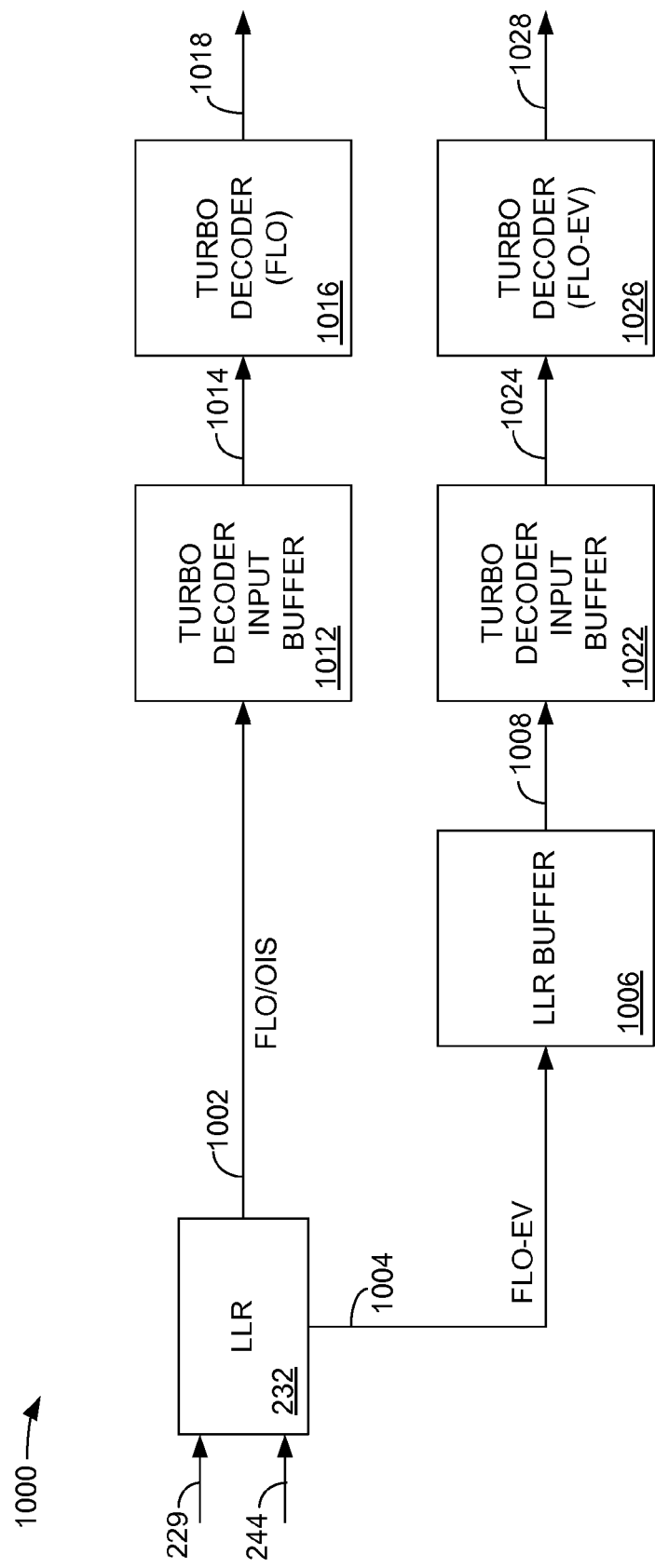
FIG. 10 is a block diagram illustrating an embodiment of a receiver that can receive and decode FLO and FLO-EV data simultaneously.

FIG. 10 is a block diagram 1000 illustrating a first embodiment of a receiver that can receive and decode FLO and FLO-EV data simultaneously.

The receiver implementation shown in FIG. 10 includes the log likelihood ratio (LLR) generator 232 which provides the OIS information and the FLO data over connection 1002. It is assumed in this example that the OIS information will always be transported using a transmit mode that is decodable by FLO and FLO-EV devices so that it can be decoded by any implementation of the portable communication device 200. The FLO data is also provided over connection 1002 so that it can be decoded without any processing delay. The LLR generator 232 provides the FLO-EV data over connection 1004 to an LLR buffer 1006. The LLR buffer 1006 is a memory element, which buffers the FLO-EV data.

The FLO data and the OIS information is provided over connection 1002 to a turbo decoder input buffer 1012. The turbo decoder input buffer 1012 buffers the FLO data and the OIS information and provides the received FLO data stream over connection 1014 to a turbo decoder 1016. The turbo decoder 1016 decodes the FLO data and provides the decoded FLO data over connection 1018 to other processing elements (not shown) as known in the art.

The LLR buffer 1006 buffers the FLO-EV data and provides the FLO-EV data stream over connection 1008 to a turbo decoder input buffer 1022. The turbo decoder input buffer 1022 is similar to the turbo decoder input buffer 1012, except that it buffers the FLO-EV the data. The FLO-EV data is provided over connection 1024 to a turbo decoder 1026. The turbo decoder 1026 decodes the FLO-EV data and provides the decoded FLO-EV data over connection 1028 to other processing elements (not shown) as known in the art.

The receiver architecture 1000 allows simultaneous decoding of both FLO and FLO-EV data at the expense of having two turbo decoder processing paths.

Figure 11:
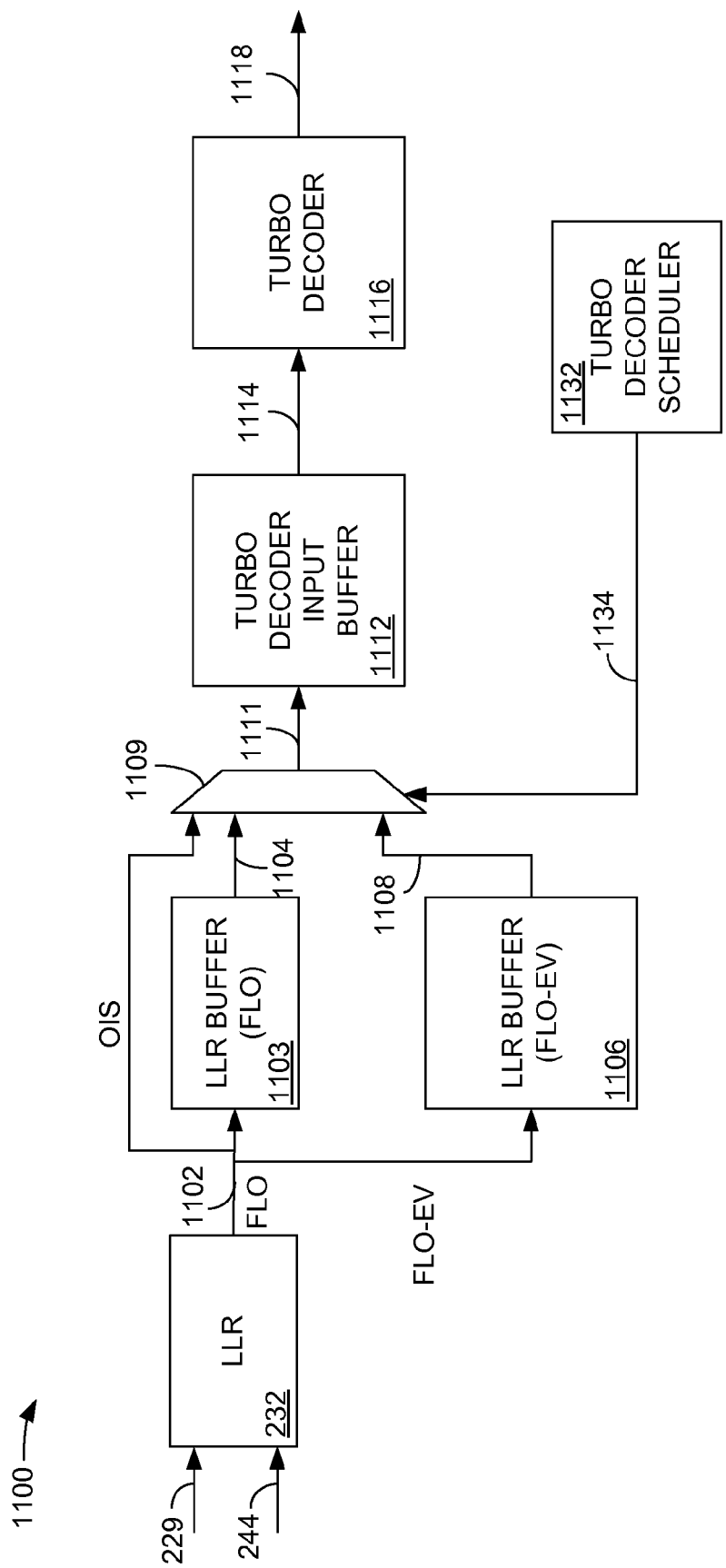
FIG. 11 is a block diagram illustrating an alternative embodiment of a receiver that can receive and decode FLO and FLO-EV data simultaneously.

FIG. 11 is a block diagram 1100 illustrating a first alternative embodiment of a receiver that can receive and decode FLO and FLO-EV data simultaneously.

The receiver implementation shown in FIG. 11 includes the log likelihood ratio (LLR) generator 232 which provides the OIS information, the FLO data and the FLO-EV data over connection 1102. It is assumed in this example that the OIS information will always be transported using a PHY Type 1 transmit mode so that it can be decoded by any implementation of the portable communication device 200. In the embodiment shown in FIG. 11, the FLO data is provided over connection 1102 to an LLR buffer 1103, which buffers the FLO data in a memory element. The LLR buffer 1103 can be similar to the LLR buffer 1006 described in FIG. 10.

The LLR generator 232 provides the FLO-EV data over connection 1102 to an LLR buffer 1106. The LLR buffer 1106 is a memory element, similar to the LLR buffer 1006 of FIG. 10, which buffers the FLO-EV data.

In the embodiment shown in FIG. 11, a multiplexer 1109 controls the flow of OIS and data to a single turbo decoder processing path comprising a turbo decoder input buffer 1112 and a turbo decoder 1116. The OIS is provided to the multiplexer 1109 over connection 1102, the FLO data is provided from the LLR buffer 1103 via connection 1104 to the multiplexer 1109, and the FLO-EV data is provided from the LLR buffer 1106 via connection 1108 to the multiplexer 1109.

The multiplexer 1109 is controlled by a turbo decoder scheduler 1132, which provides a control signal over connection 1134 to the multiplexer 1109. The control signal on connection 1134 causes the multiplexer 1109 to select any of the OIS, FLO data or FLO-EV data for output over connection 1111 to the turbo decoder input buffer 1112.

The OIS, FLO data and FLO-EV data are provided over connection 1114 to a turbo decoder 1116. The turbo decoder 1116 decodes the received data and provides the decoded data over connection 1118 to other processing elements (not shown) as known in the art.

In an embodiment, the turbo decoder scheduler 1132 determines the priority of decoding of the incoming OIS/FLO/FLO-EV streams. For instance, whenever OIS data is available, it may be important to suspend FLO and FLO-EV decoding and complete OIS decoding in order to meet the device decoding timeline. Similarly, between FLO and FLO-EV streams, the turbo decoder scheduler 1132, with input from software and upper layers (not shown), may decide to prioritize between the streams depending on the nature and amount of information carried in the streams. In yet another embodiment, the turbo decoder scheduler 1132 could have a deterministic order of scheduling decoding where OIS is followed by a FLO data stream followed by the a FLO-EV data stream, or any combination of these.

The receiver architecture 1100 allows near-simultaneous decoding of both FLO and FLO-EV data while using two memory elements and a single turbo decoder processing path.

In an alternative embodiment of FIG. 11, the LLR buffer 1103 and the LLR buffer 1106, instead of processing FLO and FLO-EV data streams, respectively, can be configured to process any first and second data streams.

Further, in an embodiment in which both FLO and FLO-EV data is transported on a single frequency, FLO MLCs generally cannot be scheduled, transported and decoded in portions of the superframe (FIG. 3) where FLO-EV MLCs are scheduled, transported and decoded during the first frame of a superframe. For example, without FLO buffering there would be a restriction on FLO MLC scheduling if FLO-EV MLCs are present. Including FLO buffering and managing the turbo decoder 1116 allows both FLO and FLO-EV MLCs in the same superframe to be decoded.

Figure 12:
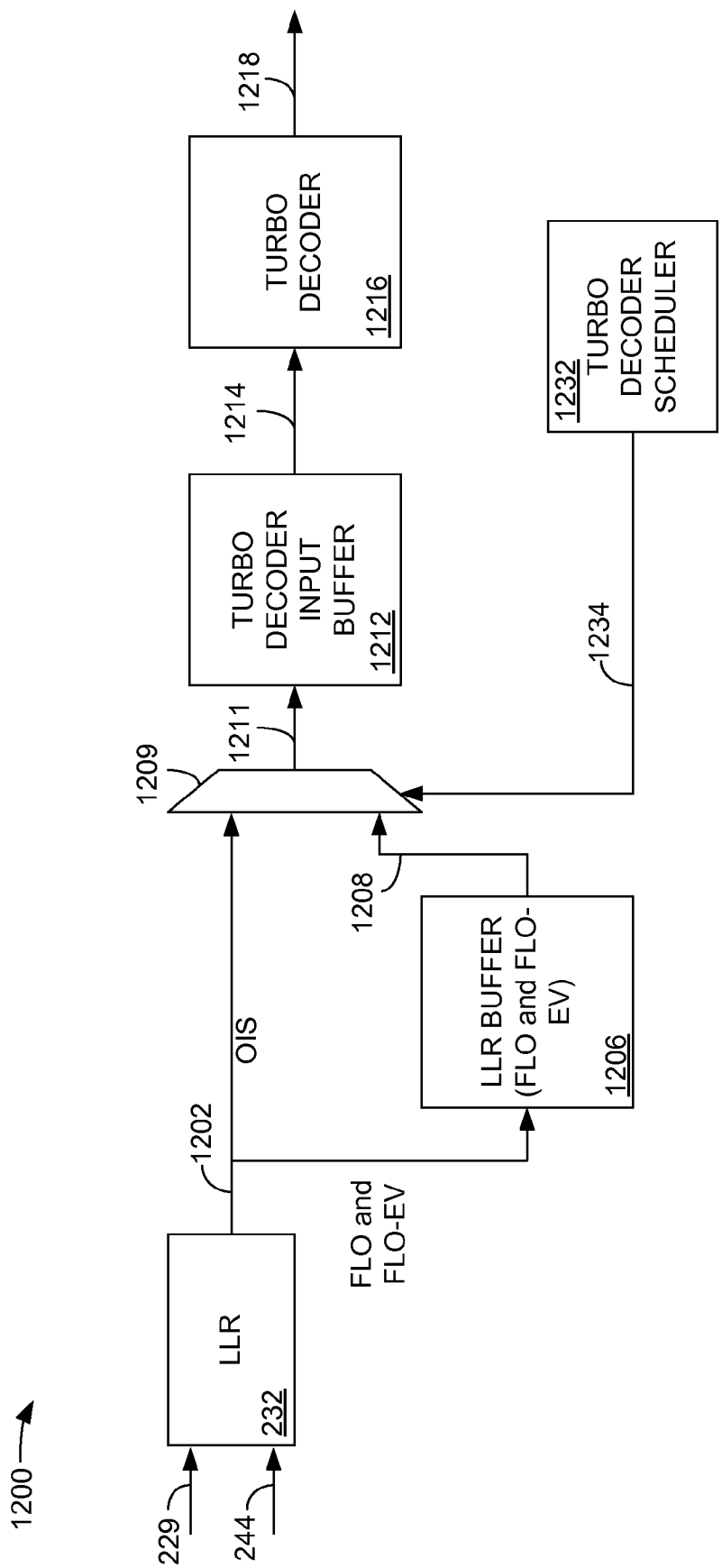
FIG. 12 is a block diagram illustrating another alternative embodiment of a receiver that can receive and decode FLO and FLO-EV data simultaneously.

FIG. 12 is a block diagram 1200 illustrating another alternative embodiment of a receiver that can receive and decode FLO and FLO-EV data simultaneously.

The receiver implementation shown in FIG. 12 includes the log likelihood ratio (LLR) generator 232 which provides the OIS information, the FLO data and the FLO-EV data over connection 1202. It is assumed in this example that the OIS information will always be transported using a PHY Type 1 transmit mode so that it can be decoded by any implementation of the portable communication device 200. In the embodiment shown in FIG. 12, the OIS information is provided to the multiplexer 1209. The multiplexer 1209 is similar to the multiplexer 1109 of FIG. 11.

The FLO data and the FLO-EV data are provided over connection 1202 to an LLR buffer 1206, which buffers the FLO data and the FLO-EV data in a memory element. The LLR buffer 1206 can be similar to the LLR buffer 1103 and 1106 described in FIG. 11, except that the LLR buffer 1206 buffers both the FLO and the FLO-EV data. The embodiment shown in FIG. 12 may be advantageous over the embodiment of FIG. 11 because the entire LLR storage is common and available to both FLO and FLO-EV data streams. For instance, if the receiver 210 decodes FLO-EV only, then the receiver could benefit from the extra storage available due to the common LLR buffer to support storage of a larger number of LLRs and hence achieve higher data throughput.

In the embodiment shown in FIG. 12, the multiplexer 1209 controls the flow of OIS and data to a single turbo decoder processing path comprising a turbo decoder input buffer 1212 and a turbo decoder 1216. The OIS is provided to the multiplexer 1209 over connection 1102, the FLO data and the FLO-EV data are provided from the LLR buffer 1206 via connection 1208 to the multiplexer 1209.

The multiplexer 1209 is controlled by a turbo decoder scheduler 1232, which provides a control signal over connection 1234 to the multiplexer 1209. The control signal on connection 1234 causes the multiplexer 1209 to select the OIS or the FLO or FLO-EV data for output over connection 1211 to the turbo decoder input buffer 1212.

The OIS, FLO data and FLO-EV data are provided over connection 1214 to a turbo decoder 1216. The turbo decoder 1216 decodes the received data and provides the decoded data over connection 1218 to other processing elements (not shown) as known in the art.

The turbo decoder scheduler 1232 also provides scheduling for coordinating the transfer of LLR data to the LLR buffer 1206 and to the turbo decoder input buffer 1212.

The receiver architecture 1200 allows near-simultaneous decoding of both FLO and FLO-EV data while using one memory element and a single turbo decoder processing path.

Figure 13:
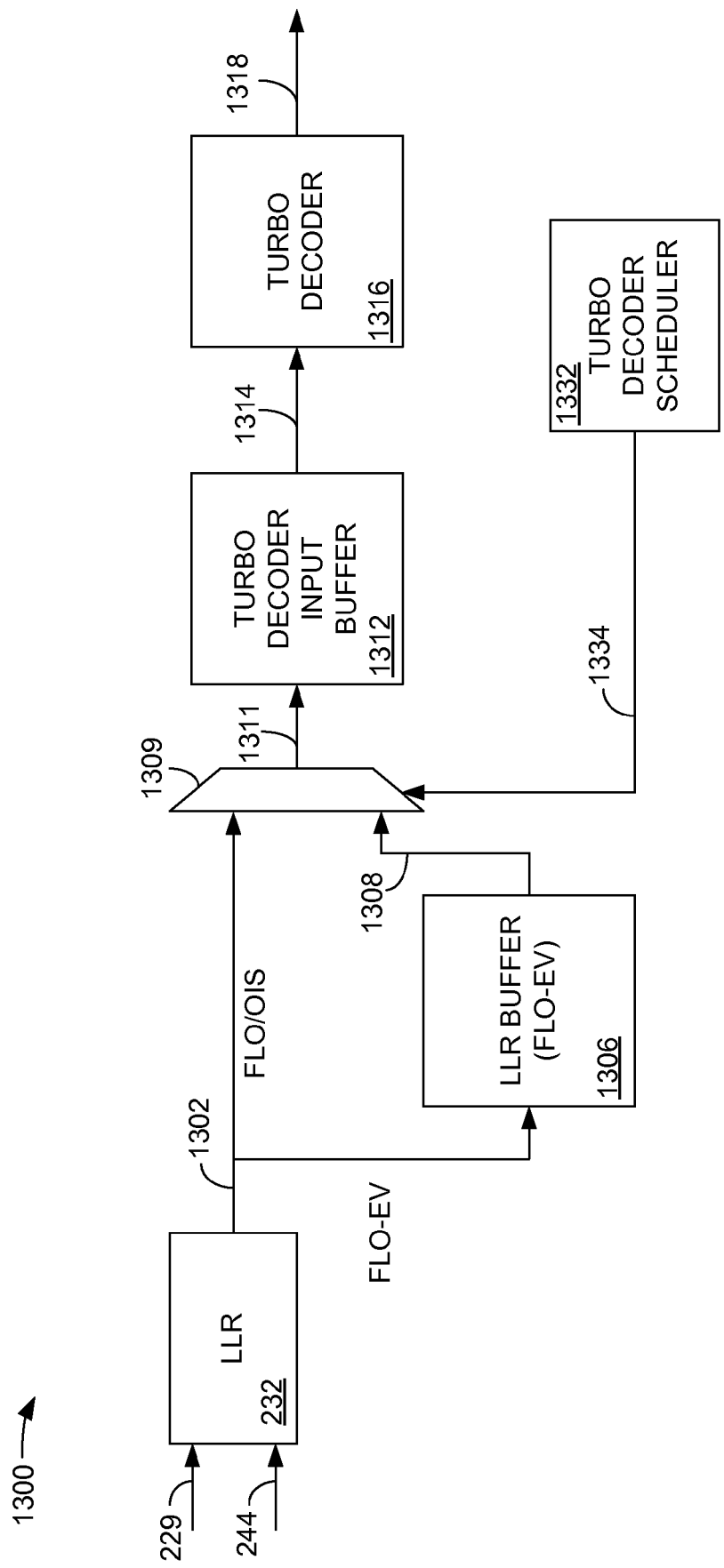
FIG. 13 is a block diagram illustrating another alternative embodiment of a receiver that can receive and decode FLO and FLO-EV data simultaneously.

FIG. 13 is a block diagram 1300 illustrating another alternative embodiment of a receiver that can receive and decode FLO and FLO-EV data simultaneously.

The receiver implementation shown in FIG. 13 includes the log likelihood ratio (LLR) generator 232 which provides the OIS information, the FLO data and the FLO-EV data over connection 1302. It is assumed in this example that the OIS information will always be transported using a PHY Type 1 transmit mode so that it can be decoded by any implementation of the portable communication device 200. In the embodiment shown in FIG. 13, the OIS information and the FLO data are provided to the multiplexer 1309. The multiplexer 1309 is similar to the multiplexer 1109 of FIG. 11.

The FLO-EV data is provided over connection 1302 to an LLR buffer 1306, which buffers the FLO-EV data in a memory element. The LLR buffer 1306 can be similar to the LLR buffer 1106 described in FIG. 11, in that the LLR buffer 1306 buffers only the FLO-EV data.

In the embodiment shown in FIG. 13, the multiplexer 1309 controls the flow of OIS and data to a single turbo decoder processing path comprising a turbo decoder input buffer 1312 and a turbo decoder 1316. The OIS and the FLO data are provided to the multiplexer 1309 over connection 1302, and the FLO-EV data is provided from the LLR buffer 1306 via connection 1308 to the multiplexer 1309.

The multiplexer 1309 is controlled by a turbo decoder scheduler 1332, which provides a control signal over connection 1334 to the multiplexer 1309. The control signal on connection 1334 causes the multiplexer 1309 to select the OIS or the FLO data; or the FLO-EV data for output over connection 1311 to the turbo decoder input buffer 1312.

The OIS, FLO data and FLO-EV data are provided over connection 1314 to a turbo decoder 1316. The turbo decoder 1316 decodes the received data and provides the decoded data over connection 1318 to other processing elements (not shown) as known in the art.

The receiver architecture 1300 allows near-simultaneous decoding of both FLO and FLO-EV data while using a single memory element that is less complex than the single memory element in FIG. 12, and a single turbo decoder processing path.

Figure 14:
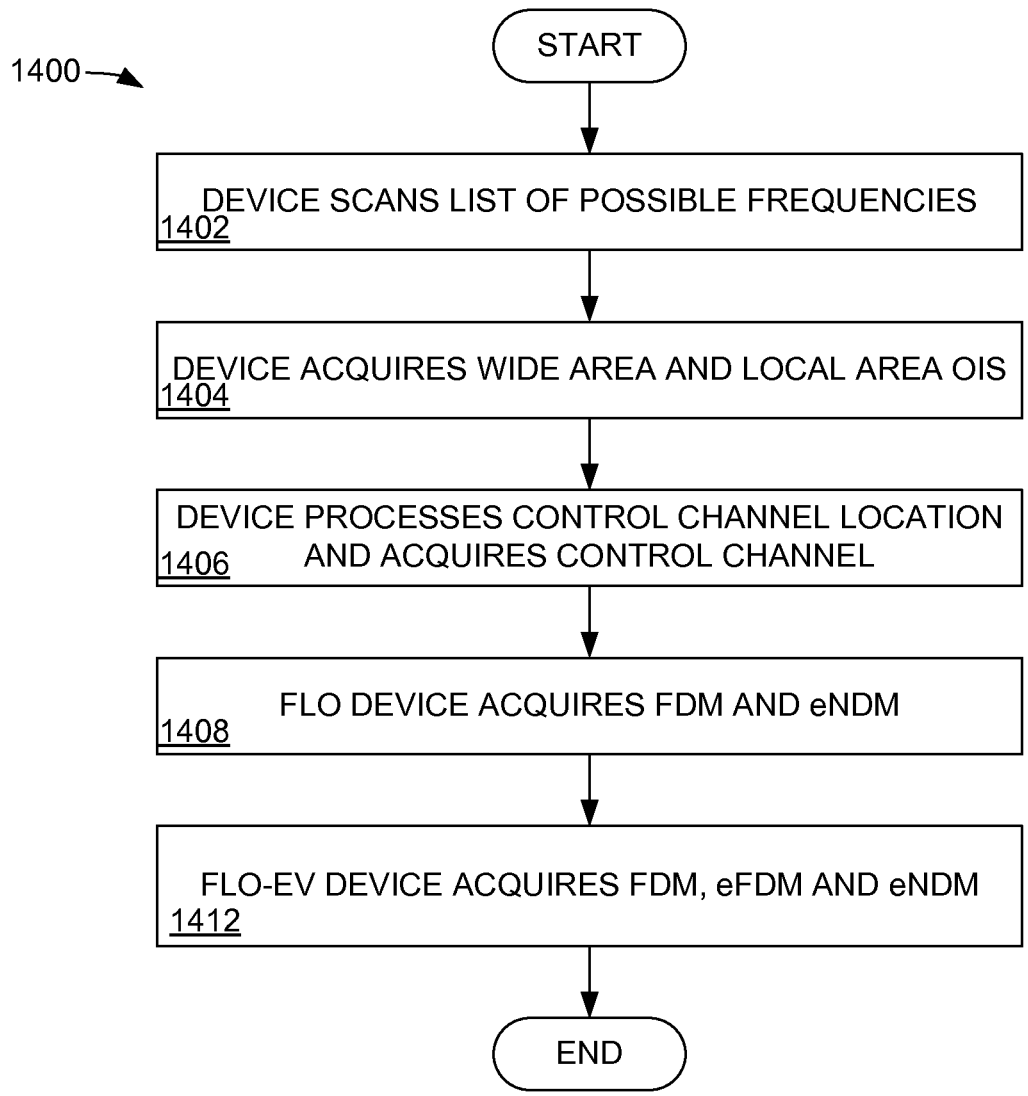
FIG. 14 is a flowchart describing an exemplary power up sequence of a portable communication device of FIG. 1.

FIG. 14 is a flowchart describing an exemplary power up sequence of a portable communication device 200 of FIG. 1. In block 1402, the portable communication device 200 scans a list of possible frequencies (RF channels) to which to tune to receive data. Depending on the configuration of the portable communication device 200, it will tune to an RF channel corresponding to a PHY Type 1 transmit mode or a PHY Type 2 transmit mode.

In block 1404 the portable communication device 200 acquires the wide-area OIS and the local area OIS in the superframe 300 (FIG. 3).

In block 1406, the portable communication device 200 processes the control channel (CC) location and acquires the control channel. In block 1408, a portable communication device 200 configured to receive FLO data acquires the flow description message (FDM) and the extended neighbor description message (ENDM). The FDM is associated with the PHY Type 1 MLC that carries the FLO data, while the ENDM is not associated with an MLC.

In block 1412, a portable communication device 200 configured to receive FLO-EV data acquires the flow description message (FDM), the extended flow description message (EFDM) and the extended neighbor description message (ENDM). The FDM is associated with the PHY Type 1 MLCs that carry the FLO data and the EFDM is associated with the PHY Type 2 MLC that carries the FLO-EV data. In an embodiment, the EFDM 736 will carry description information for PHY Type 1 MLCs that are described in the extended MLC records table 726 in the OIS, and that use a MAC trailer structure that is similar to that of PHY Type 2 MLCs with the purpose of carrying up to 8192 bits worth of data (instead of the maximum limit of 2048 bits for FLO MLCs).

Figure 15:
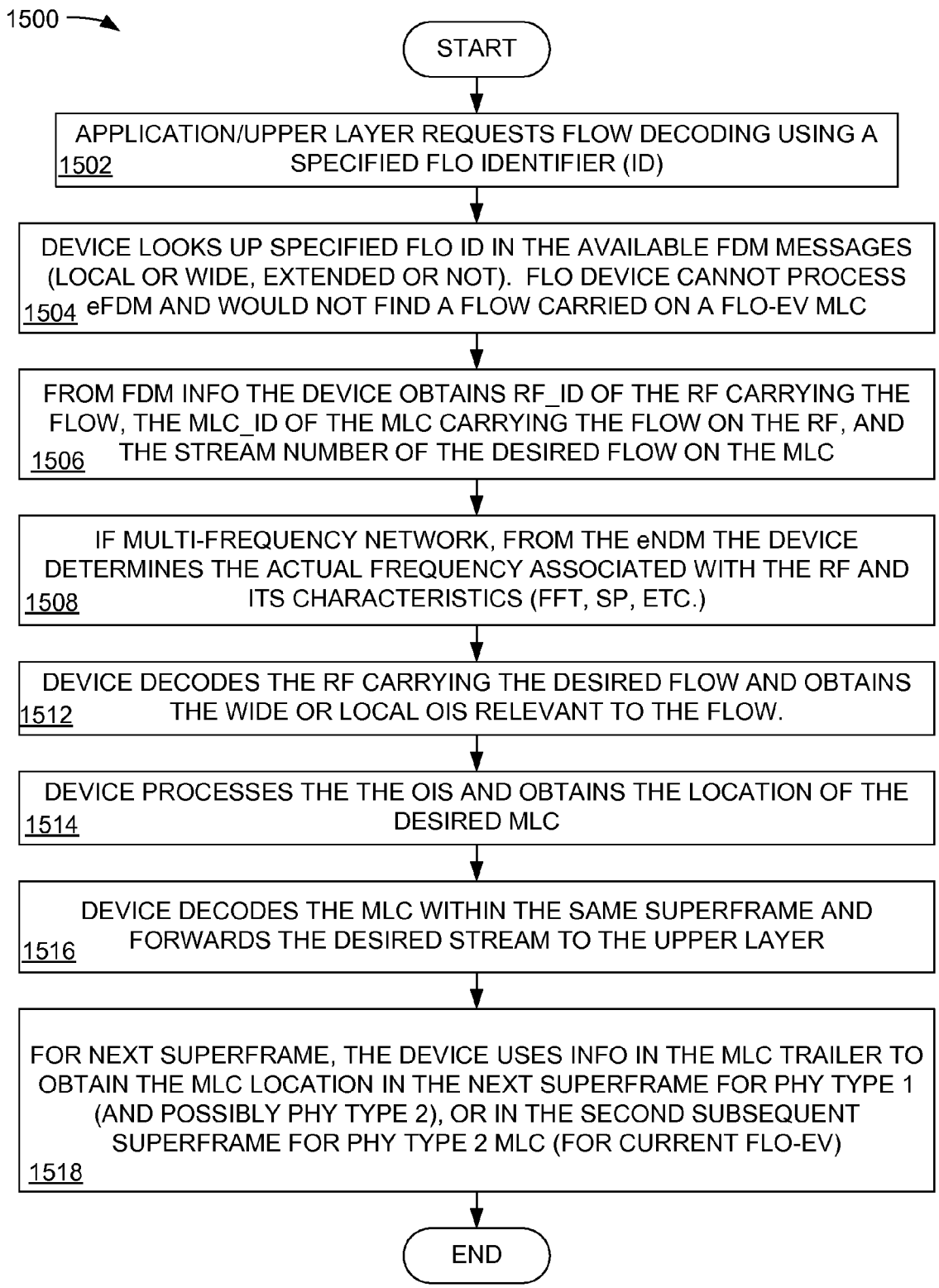
FIG. 15 is a flowchart describing flow acquisition in a portable communication device of FIG. 1.

FIG. 15 is a flowchart describing flow acquisition in a portable communication device 200 of FIG. 1. In block 1502, an application/upper layer (not shown for simplicity) requests flow decoding using a specified flow identifier (FLO_ID). The FLO_ID is provided in the FDM and in the EFDM (FIG. 7) Regarding backward compatibility, the portable communication device 200 will receive the SystemParameters message 500 and 505 (FIG. 5) and will use the MinProtocolVersion field 516 and the ProtocolVersion field 518 to determine whether it can decode the subject RF channel. If the MinProtocolVersion field 516 is set to 0, then FLO devices, that accept version 0 and 1, can decode this RF, and the CC is sent using a PHY Type 1 transmit mode. This implies a dependency between the CC transmit mode and backward compatibility. The dependency exists because, in an embodiment, a single CC is implemented. In an alternative embodiment in which a CC is sent using both a PHY type 1 transmit mode and a PHY Type 2 transmit mode, the second CC information is added at the end of the message similarly to the extended MLC location table. If backward compatibility is not desired, then the MinProtocolVersion field 516 and ProtocolVersion field 518 can be set to 2, and then the CC mode can be a PHY Type 2 transmit mode if desired.

In block 1504, the portable communication device 200 looks up the specified FLOW_ID in the available FDM 734 or EFDM 736 (local or wide). A portable communication device configured to process only FLO data cannot process the EFDM 736 and would not find a flow carried on a FLO-EV MLC.

In block 1506, from the FDM 734, the portable communication device 200 obtains the RF_ID of the radio frequency signal carrying the flow, the MLC ID of the MLC carrying the flow on the radio frequency signal, and the stream number of the desired flow on the MLC.

In block 1508, if a multiple frequency network is implemented, from the extended neighbor description message 738, the portable communication device 200 determines the actual frequency associated with the RF and its radio characteristics.

In block 1512, the portable communication device 200 decodes the radio frequency signal carrying the desired flow and obtains the wide or local OIS relevant to the particular flow.

In block 1514, the portable communication device 200 processes the OIS and obtains the locations of the desired MLC.

In block 1516, the portable communication device 200 decodes the MLC within the same superframe and forwards the desired stream to the application/upper layer.

In block 1518, for the next superframe, the portable communication device 200 uses information in the MLC trailer to obtain the MLC location in the next superframe for FLO, a PHY Type 1 or PHY Type 2 MLCs with the trailer flag NextSuperframeOffsetFlag set to 0, or in the second subsequent superframe for a PHY Type 2 MLC with the trailer flag NextSuperframeOffsetFlag set to 1.

While various embodiments of the invention have been described, it will be apparent to those of ordinary skill in the art that many more embodiments and implementations are possible that are within the scope of the invention.

What is claimed is:

1. A system for receiving data, comprising:
   a receiver configured to receive a radio frequency communication signal comprising overhead information symbol (OIS) information and at least one frame portion, the at least one frame portion having at least a first data stream and a second data stream encoded therein, wherein the receiver decodes at least one of the first data stream and the second data stream;
   a log likelihood ratio generator;
   at least one buffer connected to the log likelihood ratio generator and configured to store at least one of the first data stream or said second data stream;
   a multiplexer connected to the at least one buffer and the log likelihood ratio generator and configured to receive and multiplex the OIS information, the first data stream, and the second data stream, wherein the multiplexer is connected to receive the OIS information directly from the log likelihood ratio generator; and
   a single decoder path receiving the first data stream and the second data stream from the multiplexer and configured to simultaneously decode the first data stream and the second data stream,
   wherein the first data stream is a first multicast logical channel (MLC) and the second data stream is a second MLC.

2. The system of claim 1, wherein the first data stream corresponds to a first set of transmit modes and the second data stream corresponds to a second set of transmit modes.

3. The system of claim 2, wherein the first data stream and the second data stream are transported on the same radio frequency (RF) channel.

4. The system of claim 2, wherein the first data stream and the second data stream are transported on different radio frequency (RF) channels.

5. The system of claim 1, wherein the at least one buffer includes:
   a first buffer configured to store the first data stream; and
   a second buffer configured to store the second data stream.

6. The system of claim 5, further comprising a scheduler configured to control the passage of the first data stream and the second data stream through the multiplexer.

7. The system of claim 1, wherein the at least one buffer includes:
   a single buffer configured to store the first data stream and the second data stream.

8. The system of claim 7, further comprising a scheduler configured to control the passage of the first data stream and the second data stream through the multiplexer.

9. The system of claim 1, wherein the at least one buffer includes:
   a single buffer configured to store the second data stream,
   wherein the multiplexer is connected to receive the first data stream directly from the log likelihood ratio generator.

10. The system of claim 9, further comprising a scheduler configured to control the passage of the first data stream and the second data stream through the multiplexer.

11. A method for receiving data, comprising:
    receiving a radio frequency communication signal comprising overhead information symbol (OIS) information and at least one frame portion, the at least one frame portion having at least a first data stream and a second data stream encoded therein, wherein at least one of the first data stream and the second data stream is decoded;
    employing a log likelihood ratio generator to perform signal processing to determine accuracy of the first data stream and the second data stream, and to output the first data stream and the second data stream;
    employing at least one buffer, connected the log likelihood ratio generator, to store at least one of the first data stream or said second data stream;
    employing a multiplexer, connected to the at least one buffer and the log likelihood ratio generator, to receive and multiplex the OIS information, the first data stream, and the second data stream, wherein the multiplexer is connected to receive the OIS information directly from the log likelihood ratio generator; and
    employing a single decoder path, receiving the first data stream and the second data stream from the multiplexer, to simultaneously decode the first data stream and the second data stream, wherein the first data stream is a first multicast logical channel (MLC) and the second data stream is a second MLC.

12. The method of claim 11, wherein the first data stream corresponds to a first set of transmit modes and the second data stream corresponds to a second set of transmit modes.

13. The method of claim 12, further comprising transporting the first data stream and the second data stream on the same radio frequency (RF) channel.

14. The method of claim 12, further comprising transporting the first data stream and the second data stream on different radio frequency (RF) channels.

15. The method of claim 11, wherein employing the at least one buffer includes:
employing a first buffer to store the first data stream; and
employing a second buffer to store the second data stream.

16. The method of claim 15, further comprising controlling the multiplexing of the first data stream and the second data stream.

17. The method of claim 11, wherein employing the at least one buffer includes:
employing a single buffer to store the first data stream and the second data stream.

18. The method of claim 17, further comprising controlling the multiplexing of the first data stream and the second data stream.

19. The method of claim 11, wherein employing the at least one buffer includes:
employing a single buffer to store the second data stream, wherein the multiplexer is connected to receive the first data stream directly from the log likelihood ratio generator.

20. The method of claim 19, further comprising controlling the multiplexing of the first data stream and the second data stream.

21. A portable communication device, comprising:
a receiver configured to receive a radio frequency communication signal comprising overhead information symbol (OIS) information and at least one frame portion, the at least one frame portion having at least a first data stream and a second data stream encoded therein, wherein the receiver decodes at least one of the first data stream and the second data stream;
a log likelihood ratio generator;
at least one buffer connected to the log likelihood ratio generator and configured to store at least one of the first data stream or said second data stream;
a multiplexer connected to the at least one buffer and the log likelihood ratio generator and configured to receive and multiplex the OIS information, the first data stream, and the second data stream, wherein the multiplexer is connected to receive the OIS information directly from the log likelihood ratio generator; and
a single decoder path receiving the first data stream and the second data stream from the multiplexer and configured to simultaneously decode the first data stream and the second data stream,
wherein the first data stream and the second data stream are simultaneously decoded, and
wherein the first data stream is a first multicast logical channel (MLC) and the second data stream is a second MLC.

22. The portable communication device of claim 21, wherein the first data stream corresponds to a first set of transmit modes and the second data stream corresponds to a second set of transmit modes.

23. The portable communication device of claim 22, wherein the first data stream and the second data stream are transported on the same radio frequency (RF) channel.

24. The portable communication device of claim 22, wherein the first data stream and the second data stream are transported on different radio frequency (RF) channels.

25. The method of claim 21, wherein the at least one buffer includes:
a first buffer configured to store the first data stream; and
a second buffer configured to store the second data stream.

26. The portable communication device of claim 25, further comprising a scheduler configured to control the passage of the first data stream and the second data stream through the multiplexer.

27. The method of claim 21, wherein the at least one buffer includes:
a single buffer configured to store the first data stream and the second data stream.

28. The portable communication device of claim 27, further comprising a scheduler configured to control the passage of the first data stream and the second data stream through the multiplexer.

29. The method of claim 21, wherein the at least one buffer includes:
a single buffer configured to store the second data stream, wherein the multiplexer is connected to receive the first data stream directly from the log likelihood ratio generator.

30. The portable communication device of claim 29, further comprising a scheduler configured to control the passage of the first data stream and the second data stream through the multiplexer.

31. The system of claim 1, further comprising a scheduler configured to control the passage of the OIS information, the first data stream, and the second data stream through the multiplexer.

32. The method of claim 11, further comprising employing a scheduler configured to control the passage of the OIS information, the first data stream, and the second data stream through the multiplexer.

33. The portable communication device of claim 21, further comprising a scheduler configured to control the passage of the OIS information, the first data stream, and the second data stream through the multiplexer.

* * * * *